US012710774B2

(12) United States Patent
Ibsen et al.

(10) Patent No.: US 12,710,774 B2
(45) Date of Patent: Aug. 18, 2026

(54) CONTROL VALVE

(71) Applicant: Flowcon International ApS, Slagelse (DK)

(72) Inventors: Bjarne Wittendorff Ibsen, Slagelse (DK); Carsten Enøe Møller, Slagelse (DK)

(73) Assignee: Flowcon International ApS, Slagelse (DK)

( * ) Notice: Subject to any disclaimer, the term of this patent is extended or adjusted under 35 U.S.C. 154(b) by 0 days.

(21) Appl. No.: 19/066,605

(22) Filed: Feb. 28, 2025

(65) Prior Publication Data

US 2025/0198532 A1 Jun. 19, 2025

Related U.S. Application Data

(63) Continuation of application No. 18/717,714, filed as application No. PCT/DK2022/050267 on Dec. 6, 2022, now Pat. No. 12,264,751.

(51) Int. Cl.
*G05D 16/00* (2006.01)
*F16K 3/10* (2006.01)
(Continued)

(52) U.S. Cl.
CPC ............ *G05D 16/028* (2019.01); *F16K 3/10* (2013.01); *F16K 3/34* (2013.01); *F16K 11/0743* (2013.01); *F16K 11/0746* (2013.01); *F16K 25/005* (2013.01); *F16K 31/041* (2013.01)

(58) Field of Classification Search
CPC ........ F16K 31/041; F16K 25/005; F16K 3/10; F16K 3/34; F16K 11/074; F16K 11/0743;
(Continued)

(56) References Cited

U.S. PATENT DOCUMENTS 4,574,840 A 3/1986 Schumann et al.
5,694,967 A 12/1997 Schultz
(Continued)

FOREIGN PATENT DOCUMENTS

CN 204083361 1/2015
CN 204328068 5/2015
(Continued)

OTHER PUBLICATIONS

Partial Supplementary European Search Report dated Nov. 19, 2025 from European Patent Application No. 22910249.6.
(Continued)

*Primary Examiner* — Marina A Tietjen
(74) *Attorney, Agent, or Firm* — Crockett & Crockett, PC; K. David Crockett, Esq.

(57) ABSTRACT

A control valve (1) for regulating a water flow to or from a device in a HVAC system, having a valve body (2), a shaft (15,25) rotatable about a valve axis X, a first ceramic plate (16,26) and a second ceramic plate (17,27) mounted about the shaft (15, 15', 15''), the first ceramic plate (16,26) being stationary, while the second ceramic plate (17,27) is coupled to the shaft (15, 15', 15'') to rotate with the shaft (15, 15', 15''), the first ceramic plate (16,26) having first- and second through-going openings (31, 32, 41, 42), the second ceramic plate (17,27) having one through-going opening or recess (33,43), first-, second- and third, ports (11, 21, 12, 22, 13, 23), wherein the second ceramic plate (17, 27) is rotatable: to a first range of angular positions in which the first port (11, 21) is in fluid communication with the third port (13, 23), and to a second, different range of angular positions in which the second port (12, 22) is in fluid communication with the third port (13, 23).

20 Claims, 17 Drawing Sheets

(51) Int. Cl.

| | |
|---|---|
| ***F16K 3/34*** | (2006.01) |
| ***F16K 11/074*** | (2006.01) |
| ***F16K 25/00*** | (2006.01) |
| ***F16K 31/04*** | (2006.01) . |

(58) Field of Classification Search
CPC .... F16K 11/0746; F16K 27/045; F16K 3/314; G05D 16/028; B60H 1/00485; F01P 7/16
See application file for complete search history.

(56) References Cited

U.S. PATENT DOCUMENTS

| | | | | |
|---|---|---|---|---|
| 8,763,640 | B2 | 7/2014 | Kojima et al. | |
| 9,273,787 | B2 * | 3/2016 | Ibsen | F16K 5/0407 |
| 9,410,628 | B2 | 8/2016 | Bachofer | |
| 10,429,860 | B2 * | 10/2019 | Møller | F16K 17/044 |

FOREIGN PATENT DOCUMENTS

| | | |
|---|---|---|
| CN | 107606237 | 1/2018 |
| DE | 3711949 | 11/1987 |
| EP | 3037698 | 6/2016 |
| EP | 3483692 | 5/2019 |
| WO | WO2021049223 | 3/2021 |

OTHER PUBLICATIONS

International Search Report and Written Opinion dated Feb. 24, 2023 from IA No. PCT/DK2022/050267.

* cited by examiner 100
12

2
90
11
13
21
23

100

90
11
12
2
21
12

70
73
85
80
35
32
16
74
31
72
36
33
38
37
17

35
70
73
32
84
16
86
85
33
36
17
72
38
37
60
65
27
45
43

46
26
42
41
73
70
78

Fig. 14
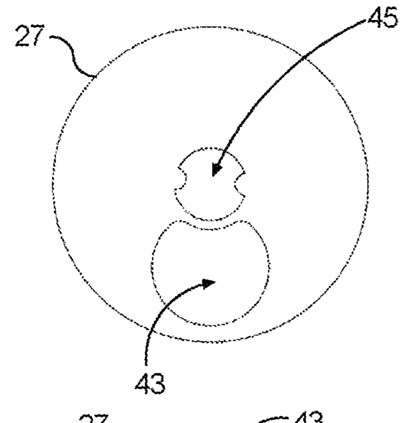
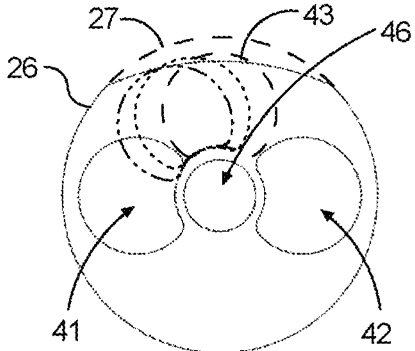
Fig. 15
Fig. 16
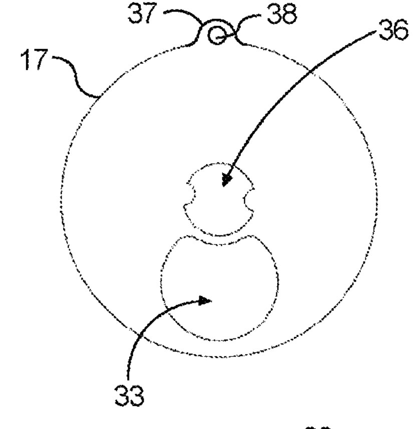
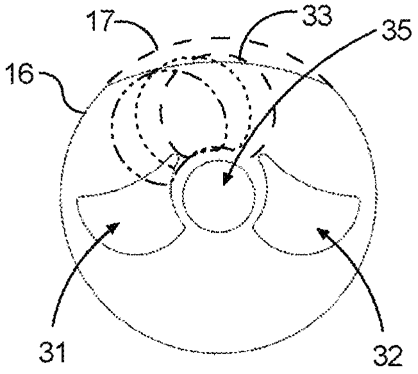
Fig. 17
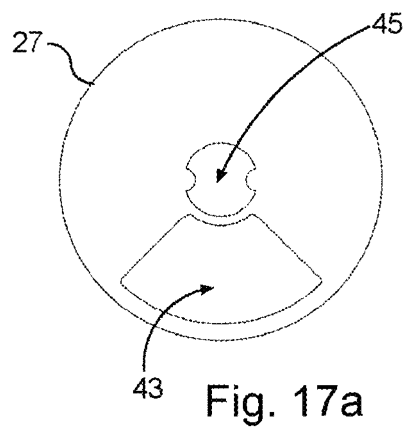
Fig. 17a
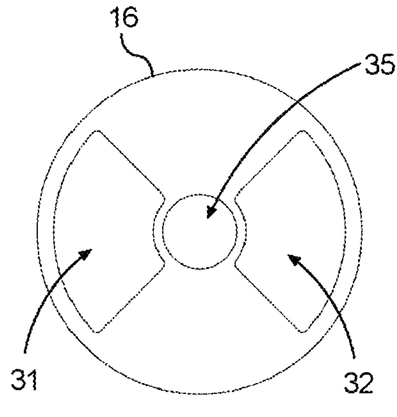
Fig. 17b 9
15
77
18
14
19
32
70
16
80
36
33
72
38
17
37
60
61
65
15'
62
15''
43
27
45
26
41
7
28
29
24

62
15"
27
43
45
26
41
42
29
7
28
24
12
13
11
49
22
21
23
2

180
1
15
9
14
18
11
19
12
31
16
32
17
20

1
15'
30
26
27
21
22
41
42
28
2
29
24
X

CONTROL VALVE

This application is a continuation of U.S. application Ser. No. 18/717,714, filed Jun. 7, 2024, pending, which is a national stage of PCT Application PCT/DK2022/050267, filed Dec. 6, 2022, which claims priority to Danish Patent Applications PA2021/170651, filed Dec. 22, 2021, PA2021/170652, filed Dec. 22, 2021, and PA2021/170653, filed Dec. 22, 2021.

TECHNICAL FIELD

The disclosure relates to, a control valve for selectively supplying a fluid flow from several sources to a device, e.g., a heating or cooling convector, preferably a control valve that can be associated with or can comprise a differential pressure regulator.

BACKGROUND

Control valves, e.g., 3-way valves of 6-way valves are used in fluid systems comprising several fluid sources, e.g., warm- and cold water and associated hot and cold water return lines, which need to be selectively coupled to a heating or cooling convector, e.g. in Heating, Ventilation, and Air Condition (HVAC) systems used for controlling the indoor climate of buildings. HVAC systems comprise heating and cooling convectors coupled to central sources of heating and cooling water, each convector being coupled to the two water sources by a control valve such that the convectors may be selectively coupled to the hot- or the cold fluid source depending on whether the convector is required to heat or cool. The hot- or cold water flows through the convectors and accordingly the same amount of water that enters the convector needs to exit the convector, and hence the convector needs to be selectively coupled to either a return line for cold water or a return line for hot water by another 3-way valve. The three-way valve for the inlet side and the 3-way valve for the outlet side are at times combined into one 6-way valve, i.e. a 6-way valve in a single valve body. A differential pressure regulator can be used in with a 3-way valve or with the return part of a 6-way valve that regulates the return flow. The differential pressure regulator can either be placed in a cavity of the valve body of the 3- or 6-way control valve (integral solution) or be placed in a separate valve body that is arranged downstream of the outlet of the 3- or 6-way control valve (separate solution). Both the integral and the separate solutions have advantages and disadvantages, the choice will often depend on circumstances and preferences.

3-way or 6-way control valves often use a spherical element as the movable valve member for regulating the connections and the flow, these valves are often referred to as "ball" valves. However, suspended particles in the water may cause the valve body and the ball (spherical element) to wear, and the "ball" (movable valve member) may get stuck. US2018094733A1 uses a spherical element as the movable valve member. Such 3-way or 6-way control valves that use a spherical element as the movable valve member for regulating the connections and the flow are often referred to as "ball" valves. However, suspended particles in the water may cause the valve body and the ball (spherical element) to wear, and the "ball" (movable valve member) may get stuck. Further, valves that use a spherical element as the movable valve member have substantial dead-band during change-over (typically 20° deadband), which hampers accurate control over the liquid flow.

WO2021049223 discloses a valve device that comprises a channel formation part that has formed therein at least one channel hole through which a fluid is to pass; and a drive part that outputs rotational force. The valve device also comprises a shaft that rotates around a prescribed center line due to the rotational force outputted by the drive part. The valve device also comprises a rotor that: has a sliding surface that slides relative to an opening surface which is the portion of the channel formation part at which the channel hole opens; and, in association with the rotation of the shaft, increases/decreases the degree to which the channel hole is open. The valve device also comprises an urging member that urges the rotor toward the channel formation part. The valve device also comprises a connection structure that tiltably connects the shaft to the rotor such that the state of contact between the sliding surface and the opening surface is maintained regardless of the posture of the shaft.

SUMMARY

It is an object of the invention to provide a 3-way valve that is durable, reliable, and requires little maintenance.

According to a first aspect, there is provided a control valve for regulating a water flow to or from a device in a HVAC system, such as a cooling or heating convector, the control valve comprising: a valve body, a shaft rotationally suspended in the valve body with a portion of the shaft configured to be coupled to an actuator for rotation about a valve axis, a first ceramic plate and a second ceramic plate mounted about the shaft and in intimate contact with each other, the first ceramic plate being held stationary against motion about the shaft, while the second ceramic plate is coupled to the shaft to rotate with the shaft without introducing any rotation of the first ceramic plate, the first ceramic plate having a first through-going opening or recess and a neighboring second through-going opening or recess, the second ceramic plate having one through-going opening or recess, a first, preferably radially directed, port, a second, preferably radially directed, port and a third, preferably radially directed, port, wherein the second ceramic plate is rotatable: to a first range of angular positions in which the first port is in fluid communication with the third port by the one through-going opening or recess overlapping at least partially with the first through-going opening or recess, and to a second range of angular positions in which the second port is in fluid communication with the third port by the one through-going opening or recess overlapping at least partially with the second through going opening or recess, wherein the first range of angular positions does not overlap with the second range of angular positions.

By providing a control valve in which the overlap area is determined by openings in two ceramic plates that are in intimate contact with one another, a more reliable, robust, and less maintenance-requiring HVAC control valve is provided.

According to a possible implementation of the first aspect, the one through-going opening or recess only overlaps with an opening in the first ceramic plate in the first- and second range of angular positions.

According to a possible implementation of the first aspect there is no through-going opening in the first ceramic plate between the neighboring first- and second through-going openings.

According to a possible implementation of the first aspect, through going openings in a ceramic plate are considered to be neighboring when there is no through-going opening between the two openings in the ceramic plate.

According to a possible implementation of the first aspect, the area of the first ceramic plate that overlaps with the one through-going opening or recess in an angular range disposed between the first range of angular positions and the second range of angular positions is solid.

According to a possible implementation of the first aspect, the angular range disposed between the first range of angular positions and the second range of angular positions is the smallest of the two angular ranges disposed between the first range of angular positions and the second range of angular positions.

According to a possible implementation of the first aspect, the size, shape, and position of the openings are such that when the second ceramic plate is in an intermediary position or an intermediary range of positions between the first and the second angular ranges, neither of the first inlet or the second inlet connects to the outlet whereby a closed position or a range of closed is provided.

According to a possible implementation of the first aspect, the size, shape, and position of the openings are such that when the second ceramic plate is in an intermediary position or an intermediary range of positions between the first and the second angular ranges neither of the first outlet or the second outlet connects to the inlet, whereby a closed position or a range of closed is provided.

According to a possible implementation of the first aspect, the closed position or range of closed positions lies between the first- and second angular start positions.

According to a possible implementation of the first aspect, the first and second openings in the first ceramic plates and the one opening in the second ceramic plate are sized, shaped, and positioned to obtain a straight and radially directed between the overlap area and to the angular position of the second ceramic plate, preferably by the edges that define the size of the overlap being straight and radially directed and the straight edges connecting to tangentially extending edges to define the respective first, second and one opening.

According to a possible implementation of the first aspect, the first- and second ceramic plates are fluidically arranged between the first port and the third port, and the first- and second ceramic plates being fluidically arranged between the second port and the third port.

According to a possible implementation of the first aspect, a first fluid passage connects the first port to the first opening or recess in the first ceramic plate at a side of the first ceramic plate that faces away from the second ceramic plate, a second fluid passage connects the second port to the second opening or recess in the first plate on the side of the second ceramic plate that faces away from the second ceramic plate, and a third fluid passage connecting the third port to the one opening or recess in the second ceramic plate on the side of the second ceramic plate that faces away from the first ceramic plate.

According to a possible implementation of the first aspect, the first opening or recess in the first ceramic plate at least partially overlaps the one opening or recess in the second ceramic plate in a first range of angular positions of the second ceramic plate for fluidically connecting the first port to the third port, and the second opening or recess in the first ceramic plate being at least partially aligned with the one opening or recess in the second ceramic plate in a second range of angular positions of the second ceramic plate for fluidically connecting the second port to the third port.

According to a possible implementation of the first aspect, the control valve comprises an insert, the insert preferably being a thermoplastic element, the thermoplastic element preferably being a molded element, the insert being received in the valve body, and the insert defining the first and second fluid passages.

According to a possible implementation of the first aspect, the first fluid passage defined in the insert sealingly connects to the first port and to the first recess or opening in the first ceramic plate, and wherein the second fluid passage is defined in the insert sealingly connects to the second inlet port and to the second recess or opening in the first ceramic plate.

According to a possible implementation of the first aspect, the insert defines a lumen with the shaft extending through the lumen with a preferably circular cross-section, the shaft preferably having a circular cross-section and a diameter relative to the diameter of the lumen that results in a, preferably small, clearance between the shaft and the lumen.

According to a possible implementation of the first aspect, the first port, the second port, and the third port are arranged in one and the same plane.

According to a possible implementation of the first aspect, the first port, the second port, and the third port are integral parts of the valve body, and are substantially straight tubular members that are directed radially to the valve axis X and are preferably arranged without axial offset relative to one another.

According to a possible implementation of the first aspect, the first port, the second port, and the third port are integral parts of the valve body, and are substantially straight tubular members that are directed radially to the valve axis X and are preferably arranged without axial offset relative to one another the at least one first port, forms a first return flow outlet to be connected to a hot water return line of the HVAC system, the second port, forms a second return flow outlet to be connected to a cold water return line of the HVAC system, and the third port forms a return flow inlet to be connected to the device.

According to a possible implementation of the first aspect, the at least one first port, forms a first supply flow inlet to be connected to a hot water supply line of the HVAC system, the second port, forms a second supply flow inlet to be connected to a cold water supply line of the HVAC system, and the third port forms a supply flow outlet to be connected to the device.

According to a possible implementation of the first aspect, the first angular range lies between a first angular start position of the second ceramic plates where overlap between the one opening or recess and the first opening or recess starts and a first angular end position where overlap between the one opening or recess and the first opening or recess is at a maximum, and the second angular range lies between a second angular start position of the second ceramic plate where overlap between the one opening or recess and the second opening or recess begins and a second angular end position where overlap between the one opening or recess and the second opening or recess is at a maximum.

According to a possible implementation of the first aspect, the overlap between the one opening or recess and the first opening or recess has an area that increases from zero at the first angular start position to a maximum at the first angular end position, and the overlap between the one opening or recess and the second opening or recess has an area that increases from zero at the second angular start position to a maximum at the second angular end position.

According to a possible implementation of the first aspect, the first opening or recess and the one opening or recess have a contour shaped and sized to result in an overlap area that increases linearly or faster than linearly with increasing distance from the first angular start position towards the first angular end position, and the second opening or recess and the one opening or recess have a contour shaped and sized to result in an overlap area that increases linearly or faster than linearly with increasing distance from the second angular start position towards the second angular end position.

According to a possible implementation of the first aspect, the first opening or recess and the one opening or recess have a contour shaped and sized to result in an overlap area that increases according to a function that results in a linear relation between the flow through the overlap and the angle of the second plate when the angle is between the first angular start position and the first angular end position, assuming that the pressure differential over the overlap is substantially constant, and the second opening or recess and the one opening or recess have a contour shaped and sized to result in an overlap area that increases according to a function that results in a linear relation between the flow through the overlap and the angle of the second plate when the angle is between the second angular start position and the second angular end position, assuming that the pressure differential over the overlap is substantially constant.

According to a possible implementation of the first aspect, the first opening or recess and the one opening or recess have a contour shaped and sized to result in an overlap area that increases according to a function that results in an equal percentage relation between the flow through the overlap and the angle of the second plate when the angle is between the first angular start position and the first angular end position, assuming that the pressure differential over the overlap is substantially constant, and the second opening or recess and the one opening or recess have a contour shaped and sized to result in an overlap area that increases according to a function that results in an equal percentage relation between the flow through the overlap and the angle of the second plate when the angle is between the second angular start position and the second angular end position, assuming that the pressure differential over the overlap is substantially constant.

According to a possible implementation of the first aspect, the contour of the first- or second opening or recess comprises a substantially V-shaped portion, with a first leg of the V-shaped portion being substantially tangentially arranged and a second leg of the V-shaped portion extending in a direction between radial and tangential, the first leg and the second leg preferably forming an acute angle.

According to a possible implementation of the first aspect, the bottom of the V-shaped portion is rounded for reducing notch effect, the rounded bottom preferably being small relatively to the V-shaped portion.

According to a possible implementation of the first aspect, the first leg of the V-shaped portion is outside the rounded bottom is substantially tangentially arranged and the second leg of the V-shaped portion outside the rounded bottom is arranged at an angle to the radial direction, or extends in a direction between radial and tangential, the first leg and the second leg preferably forming an acute angle.

According to a possible implementation of the first aspect, the first leg of the V-shaped portion forms a flat or conical surface and/or wherein the second leg of the V-shaped portion forms a flat or conical surface.

According to a possible implementation of the first aspect, the V-shaped portion resembles a letter V with straight legs or a letter V with inwardly curved legs, or a letter V with an inwardly curved leg and a straight leg, or a letter V with an inwardly curved leg and an outwardly curved leg.

According to a possible implementation of the first aspect, the bottom of the V-shaped portion of the first opening or recess is tangentially directed opposite to the bottom of the V-shaped portion of the second opening or recess.

According to a possible implementation of the first aspect, the bottom of the V-shaped portion of the first- and second opening is radially closer to the shaft than to an outer circumference of the first ceramic plate.

According to a possible implementation of the first aspect, the top of the first and second leg of the V-shaped portion is connected by a curved portion that forms a concave surface.

According to a possible implementation of the first aspect, the first- and second openings have a deltoid contour.

According to a possible implementation of the first aspect, the surfaces forming the first or second opening or recess are at a substantially right angle to the sides of the first ceramic plate.

According to a possible implementation of the first aspect, the first- and second ceramic plates are flat-sided plates with a preferably substantially uniform thickness.

According to a possible implementation of the first aspect, the control valve comprises:

a first and second inlet for connecting to the HVAC system, one outlet for connecting to the device, a regulator cavity for accommodating a differential pressure regulator the regulator cavity being arranged downstream of the second plate and upstream of the one outlet, a first fluid passage in fluid communication with the first inlet; and a second fluid passage in fluid communication with the second inlet, wherein the first fluid passage is in fluid communication with the regulator cavity in the first range of angular positions of the second ceramic plate and the second fluid passage is in fluid communication with the regulator cavity in the second range of angular positions of the second ceramic plate and wherein, when a differential pressure regulator is located in the regulator cavity a constant differential pressure can be maintained across the first- and second ceramic plates.

According to a possible implementation of the first aspect, the control valve comprises:

a first and second inlet for connecting to the HVAC system, and one outlet for connecting to the device, a regulator outlet for connecting to a pressure port of a differential pressure regulator the regulator outlet being arranged downstream of the second plate and upstream of the one outlet a first fluid passage in fluid communication with the first inlet; and a second fluid passage in fluid communication with the second inlet wherein the first fluid passage is in fluid communication with the regulator cavity in the first range of angular positions of the second ceramic plate and the second fluid passage is in fluid communication with the regulator cavity in the second range of angular positions of the second ceramic plate, and wherein, when a differential pressure regulator is located in the regulator cavity a constant pressure can be maintained across the first- and second ceramic plates.

It is another object of the invention to provide a 3-way valve with a cavity for receiving a differential pressure regulator that is durable, reliable, and requires little maintenance.

According to a second aspect, there is provided a control valve for selectively regulating a fluid flow to a device, such as a heating or cooling convector, the control valve comprising:

- a first inlet adapted to be connected to a first fluid source;
- a second inlet adapted to be connected to a second fluid source,
- an outlet adapted to be connected to the device;
- an inlet selection element arranged downstream of the first and the second inlets, and upstream of the outlet,
- a regulator cavity adapted to accommodate a differential pressure regulator, the regulator cavity being arranged downstream of the inlet selection element and upstream of the outlet,
- wherein the inlet selection element is moveable between:
- a first position in which the first inlet is in fluid communication with a first location in the regulator cavity, and
- a second position in which the second inlet is in fluid communication the first location in the regulator cavity,
- wherein the inlet selection element comprises a first ceramic plate and a second ceramic plate mounted about a rotatable shaft, the second ceramic plate being in intimate contact with the first ceramic plate, the first ceramic plate being held stationary against motion about the shaft, while the second ceramic plate is coupled to the shaft, to rotate with the shaft, without introducing any rotation of the first ceramic plate,
- a fourth fluid passage, in fluid communication with a second location in the regulator cavity,
- wherein the fourth fluid passage, is in fluid communication with the first inlet when the inlet selection element is in the first position, and
- wherein the fourth fluid passage, is in fluid communication with the second inlet when the inlet selection element is in the second position,
- wherein the second ceramic plate (17) is movable:
- to a first range of angular positions position in which the first inlet (11) is in fluid communication with the outlet (13), and
- to a second range of angular positions in which the second inlet (12) is in fluid communication with the outlet (13), wherein the first range of angular positions does not overlap with the second range of angular positions,
- whereby, when a differential pressure regulator is located in the regulator cavity, constant differential pressure can be maintained across the inlet selection element.

By providing a control valve with a cavity for integrating a differential pressure regulator and by using two ceramic plates that are in intimate contact with one another as the inlet selection element, the resulting control valve is durable, reliable, and requires little maintenance According to a possible implementation form of the second aspect, the first plate has a first through-going opening or recess and a second through-going opening or recess, and the second plate has one through-going opening or recess.

According to a possible implementation form of the second aspect, the second ceramic plate is movable:

- to a first range of angular positions position in which the first inlet is in fluid communication with the outlet, and
- to a second range of angular positions in which the second inlet is in fluid communication with the outlet, wherein the first range of angular positions does not overlap with the second range of angular positions.

According to a possible implementation form of the second aspect, the first- and second ceramic plates, are fluidically arranged between the first inlet and the outlet, and the first- and second ceramic plates, being fluidically arranged between the second inlet and the third outlet.

According to a possible implementation form of the second aspect, the first opening or recess in the first ceramic plate at least partially overlapping the one opening or recess in the second ceramic plate in a first range of angular positions of the second ceramic plate for fluidically connecting the first port to the third port, and the second opening or recess in the first ceramic plate being at least partially aligned with the one opening or recess in the second ceramic plate in a second range of angular positions of the second ceramic plate for fluidically connecting the second port to the third port.

According to a possible implementation form of the second aspect, the control valve comprises a differential pressure regulator arranged in the regulator cavity.

According to a possible implementation form of the second aspect, the control valve comprises a fourth fluid passage, in fluid communication with the regulator cavity or with the regulator outlet.

According to a possible implementation form of the second aspect, the control valve comprises a pressure selector, wherein the pressure selector is moveable between a first selection position, which establishes fluid communication between the first fluid passage and the fourth fluid passage, and a second selection position, which establishes fluid communication between the second fluid passage and the fourth fluid passage.

According to a possible implementation form of the second aspect, the pressure selector is operably connected to the inlet selection element such that the pressure selector is moved to the first selection position when the inlet selection element connects the first inlet to the outlet and such that the pressure selector moved to the second selection position when the inlet selection element connects the second inlet to the outlet.

According to a possible implementation form of the second aspect, the pressure selector comprises a ceramic selector plate having a side that engages a surface of the first- or second ceramic plate, for establishing intimate contact therebetween.

According to a possible implementation form of the second aspect, the control valve comprises an arrangement, configured for moving the ceramic selector plate to a first selection position when the second ceramic plate is in the first range of angular positions and to a second selection position when the second ceramic plate is in the second range of angular positions.

According to a possible implementation form of the second aspect, the ceramic selector plate establishes fluid communication between the first fluid passage and the third fluid passage when it is in the first selection position and establishes fluid communication between the second fluid passage and the third fluid passage when it is in the second selection position.

According to a possible implementation form of the second aspect, the ceramic selector plate is slidably movable relative to the first- or second ceramic plate, that it engages.

According to a possible implementation form of the second aspect, the movement of the ceramic selector plate relative to the first- or second ceramic plate, that it is in intimate contact with is guided by a recess in and/or projections on the first- or second ceramic plate, that it confronts and engages.

According to a possible implementation form of the second aspect, the ceramic selector plate is at least partially received in a recess in the first- or second ceramic plate, with at least a portion of the ceramic selector plate preferably protruding radially from the first- or second ceramic plate, that it is in intimate contact with According to a possible implementation form of the second aspect, the ceramic selector plate is a ceramic selection disc rotatably received in the recess in the first ceramic plate.

According to a possible implementation form of the second aspect, the ceramic selector disc at least partially protrudes radially from the recess.

According to a possible implementation form of the second aspect, the control valve comprises an abutment member arranged to impart rotation on the ceramic selector disc relative to the first ceramic plate when the second ceramic plate changes between the first range of angular positions and the second range of angular positions, the abutment member preferably moving in unison with the second ceramic plate.

According to a possible implementation form of the second aspect, the ceramic selector disc comprises a recess or a projection for engaging the abutment member.

According to a possible implementation form of the second aspect, the abutment member comprises a peg connected to the second ceramic plate to move in unison with the second ceramic plate, the peg preferably being partially accommodated in a bore in the second ceramic plate, the peg preferably extending axially from the secondary plate in the direction towards the first ceramic plate.

According to a possible implementation form of the second aspect, the ceramic selector plate comprises a cavity, the cavity enabling a fluidic connection between the first opening or recess and the fourth fluid passage, in the first selection position and enabling a fluid connection between the second opening and a fourth fluid passage, in the second selection position.

According to a possible implementation form of the second aspect, a first pressure communication channel, a second pressure communication channel, and a third pressure communication channel are arranged in the first ceramic plate, the first pressure connection channel opening at one end to the first opening or recess and at another end to the recess at a first position, the second pressure communication channel opening at one end to the second opening or recess and at another end to the recess at a second position and the third pressure communication channel opening at one end to the recess at a third position that is located between the first- and second positions, and at another end opening to a bore in the first ceramic plate in which the shaft is received.

According to a possible implementation form of the second aspect, the cavity is sized, shaped, and positioned to overlap with the first position and the third position when the ceramic selector disc is in the first selection position and wherein the cavity is sized, shaped and positioned to overlap with the second position and the third position when the ceramic selector disc is in the second selection position, the cavity being preferably sized shaped and positioned to only overlap with the third position when the ceramic selector disc is in an intermediate position between the first- and second selection positions.

According to a possible implementation form of the second aspect, the shaft is provided with one or more axially extending grooves, at least one of the one or more axially extending grooves opens to the other end of the third pressure communication channel, regardless of the angular position of the shaft, the one or more axially extending grooves preferably fluidically connecting to a fluid passage that connects to a pressure chamber that is axially disposed on the side of the second ceramic plate that faces away from the first ceramic plate, the pressure chamber preferably opening to the regulator cavity or the regulator outlet.

According to a possible implementation form of the second aspect, the shaft, is rotationally suspended in the valve body with a portion of the shaft, configured to be coupled to an actuator for rotation about a valve axis X.

According to a possible implementation form of the second aspect, the control valve comprises:

- a return flow inlet adapted to be connected to the device to receive a fluid returning from the device;
- a first return flow outlet adapted to be connected to the first fluid drain;
- a second return flow outlet adapted to be connected to the second fluid drain; and
- an outlet selection element arranged upstream of the first and the second return flow outlets, and downstream of the return flow inlet, wherein the return outlet selection element is moveable between a first position, in which the first return flow outlet is in fluid communication with the return flow inlet, and a second position, in which the second return flow outlet is in fluid communication with the return flow inlet.

According to a possible implementation form of the second aspect, the return outlet selection element is connected to the inlet selection element such that the return outlet selection element and the inlet selection element move in unison.

According to a possible implementation form of the second aspect, the outlet selection element comprises a first ceramic plate and a second ceramic plate mounted about a shaft and in intimate contact with each other, the first plate being held stationary against motion about the shaft, while the second plate is coupled to the shaft to rotate with the shaft without introducing any rotation of the first ceramic plate.

According to a possible implementation form of the second aspect, the first location is different from the second location.

According to a possible implementation form of the second aspect, the regulator cavity has an outwardly facing opening, wherein the first location is closer to the outwardly facing opening than the second location.

According to a possible implementation form of the second aspect, the second location is closer to a bottom of the regulator cavity than the first location.

According to a possible implementation form of the second aspect, the first location in the regulator cavity connects to an inlet chamber of the differential pressure regulator and the second location the regulator cavity connects to a pressure communication inlet of the differential pressure regulator when the differential pressure regulator is arranged in the regulator cavity.

It is an object of the invention to provide a 3-way valve that is suitable for having a differential pressure regulator arranged downstream of the outlet of the 3-way valve for maintaining a constant pressure differential over the valve member of the 3-way valve that is durable, reliable and requires little maintenance.

According to a third aspect, there is provided a control valve for selectively regulating a fluid flow to a device, such as a heating or cooling convector, the control valve comprising: a first inlet adapted to be connected to a first fluid source; a second inlet adapted to be connected to a second fluid source, an outlet adapted to be fluidically connected to an inlet of a differential pressure regulator unit; an inlet selection element arranged downstream of the first and the second inlets, and upstream of the outlet, a regulator outlet port, adapted to be fluidically connected to a pressure inlet of the differential pressure regulator unit, the inlet selection element is moveable between: a first position in which the first inlet is in fluid communication with the outlet, and a second position in which the second inlet is in fluid communication with the outlet, wherein the inlet selection element comprises a second ceramic plate mounted about a shaft, and in intimate contact with a first ceramic plate, the first plate being held stationary against motion about the shaft, while the second plate is coupled to the shaft, to rotate with the shaft, without introducing any rotation of the first plate, a fourth fluid passage, in fluid communication with the regulator outlet port, wherein the fourth fluid passage, is in fluid communication with the first inlet when the inlet selection element is in the first position, and wherein the fourth fluid passage, is in fluid communication with the second inlet when the inlet selection element is in the second position.

By providing a control valve with a regulator outlet port that is selectively fluidically connected to the selected inlet port that is connected to the outlet port and by using two ceramic plates that are in intimate contact with one another as the inlet selection element, the resulting control valve can be used with a differential pressure regulator and that is durable, reliable, without a dead-band during changeover, and requires little maintenance. Not having a dead-band during changeover provides significantly better control resolution and allows more accurate control of the liquid flow.

According to a possible implementation form of the third aspect, the first plate has a first through-going opening or recess and a second through-going opening or recess and the second plate has one through-going opening or recess.

According to a possible implementation form of the third aspect, the second ceramic plate is movable:

to a first range of angular positions position in which the first inlet is in fluid communication with the outlet, and to a second range of angular positions in which the second inlet is in fluid communication with the outlet, wherein the first range of angular positions does not overlap with the second range of angular positions.

According to a possible implementation form of the third aspect, the first- and second ceramic plates, are fluidically arranged between the first inlet and the outlet, and the first- and second ceramic plates, being fluidically arranged between the second port and the third port.

According to a possible implementation form of the third aspect, the first opening or recess in the first ceramic plate at least partially overlapping the one opening or recess in the second ceramic plate in a first range of angular positions of the second ceramic plate for fluidically connecting the first port to the third port, and the second opening or recess in the first ceramic plate being at least partially aligned with the one opening or recess in the second ceramic plate in a second range of angular positions of the second ceramic plate for fluidically connecting the second port to the third port.

According to a possible implementation form of the third aspect, the control valve comprises a pressure selector, wherein the pressure selector is moveable between a first selection position, which establishes fluid communication between the first fluid passage and the fourth fluid passage, and a second selection position, which establishes fluid communication between the second fluid passage and the fourth fluid passage.

According to a possible implementation form of the third aspect, the pressure selector is operably connected to the inlet selection element such that the pressure selector is moved to the first selection position when the inlet selection element connects the first inlet to the outlet and such that the pressure selector moved to the second selection position when the inlet selection element connects the second inlet to the outlet.

According to a possible implementation form of the third aspect, the pressure selector comprises a ceramic selector plate having a side that engages a surface of the first- or second ceramic plate, for establishing intimate contact therebetween.

According to a possible implementation form of the third aspect, the control valve comprises an arrangement, configured for moving the ceramic selector plate to a first selection position when the second ceramic plate is in the first range of angular positions and to a second selection position when the second ceramic plate is in the second range of angular positions.

According to a possible implementation form of the third aspect, the ceramic selector plate establishes fluid communication between the first fluid passage and the third fluid passage, when it is in the first selection position and establishes fluid communication between the second fluid passage and the third fluid passage when it is in the second selection position.

According to a possible implementation form of the third aspect, the ceramic selector plate is slidably movable relative to the first- or second ceramic plate, that it engages.

According to a possible implementation form of the third aspect, the movement of the ceramic selector plate relative to the first- or second ceramic plate, that it is in intimate contact with is guided by a recess in and/or projections on the first- or second ceramic plate, that it confronts and engages.

According to a possible implementation form of the third aspect, the ceramic selector plate is at least partially received in a recess in the first- or second ceramic plate, with at least a portion of the ceramic selector plate preferably protruding radially from the first- or second ceramic plate, that it is in intimate contact with According to a possible implementation form of the third aspect, the ceramic selector plate is a ceramic selection disc rotatably received in the recess in the first ceramic plate.

According to a possible implementation form of the third aspect, the ceramic selector disc at least partially protrudes radially from the recess.

According to a possible implementation form of the third aspect, the control valve comprises an abutment member arranged to impart rotation on the ceramic selector disc relative to the first ceramic plate when the second ceramic plate changes between the first range of angular positions and the second range of angular positions, the abutment member preferably moving in unison with the second ceramic plate.

According to a possible implementation form of the third aspect, the ceramic selector disc comprises a recess or a projection for engaging the abutment member.

According to a possible implementation form of the third aspect, the abutment member comprises a peg connected to the second ceramic plate to move in unison with the second ceramic plate, the peg preferably being partially accommodated in a bore in the second ceramic plate, the peg preferably extending axially from the secondary plate in the direction towards the first ceramic plate.

According to a possible implementation form of the third aspect, the ceramic selector plate comprises a cavity, the cavity enabling fluidic connection between the first opening or recess and regulator outlet port, in the first selection position and enabling a fluid connection between the second opening and the regulator outlet port, in the second selection position.

According to a possible implementation form of the third aspect, a first pressure communication channel, a second pressure communication channel, and a third pressure communication channel are arranged in the first ceramic plate, the first pressure connection channel opening at one end to the first opening or recess and at another end to the recess at a first position, the second pressure communication channel opening at one end to the second opening or recess and at another end to the recess at a second position and the third pressure communication channel opening at one end to the recess at a third position that is located between the first- and second positions, and at another end opening to a bore in the first ceramic plate in which the shaft is received.

According to a possible implementation form of the third aspect, the cavity is sized, shaped, and positioned to overlap with the first position and the third position when the ceramic selector disc is in the first selection position and wherein the cavity is sized, shaped and positioned to overlap with the second position and the third position when the ceramic selector disc is in the second selection position, the cavity being preferably sized shaped and positioned to only overlap with the third position when the ceramic selector disc is in an intermediate position between the first- and second selection positions.

According to a possible implementation form of the third aspect, the shaft is provided with one or more axially extending grooves, at least one of the one or more axially extending grooves opens to the other end of the third pressure communication channel, regardless of the angular position of the shaft, the one or more axially extending grooves preferably fluidically connecting to a fluid passage that connects to a pressure chamber that is axially disposed on the side of the second ceramic plate that faces away from the first ceramic plate, the pressure chamber preferably opening to the regulator cavity or the regulator outlet.

According to a possible implementation form of the third aspect, the shaft, is rotationally suspended in the valve body with a portion of the shaft, configured to be coupled to an actuator for rotation about a valve axis X.

According to a possible implementation form of the third aspect, the control valve comprises: a return flow inlet adapted to be connected to the device to receive a fluid returning from the device; a first return flow outlet adapted to be connected to the first fluid drain; a second return flow outlet adapted to be connected to the second fluid drain, and an outlet selection element arranged upstream of the first and the second return flow outlets, and downstream of the return flow inlet, wherein the outlet selection element is moveable between a first position, in which the first return flow outlet is in fluid communication with the return flow inlet, and a second position, in which the second return flow outlet is in fluid communication with the return flow inlet.

According to a possible implementation form of the third aspect, the outlet selection element is connected to the inlet selection element such that the outlet selection element and the inlet selection element move in unison.

According to a possible implementation form of the third aspect, the outlet selection element comprises a first ceramic plate and a second ceramic plate mounted about a shaft and in intimate contact with each other, the first plate being held stationary against motion about the shaft, while the second plate is coupled to the shaft to rotate with the shaft without introducing any rotation of the first ceramic plate.

According to a possible implementation of any one the first, second or third aspects, the first and/or ceramic plates are ceramic discs.

The foregoing and other objects are achieved by the features of the independent claims. Further implementation forms are apparent from the dependent claims, the description, and the figures.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
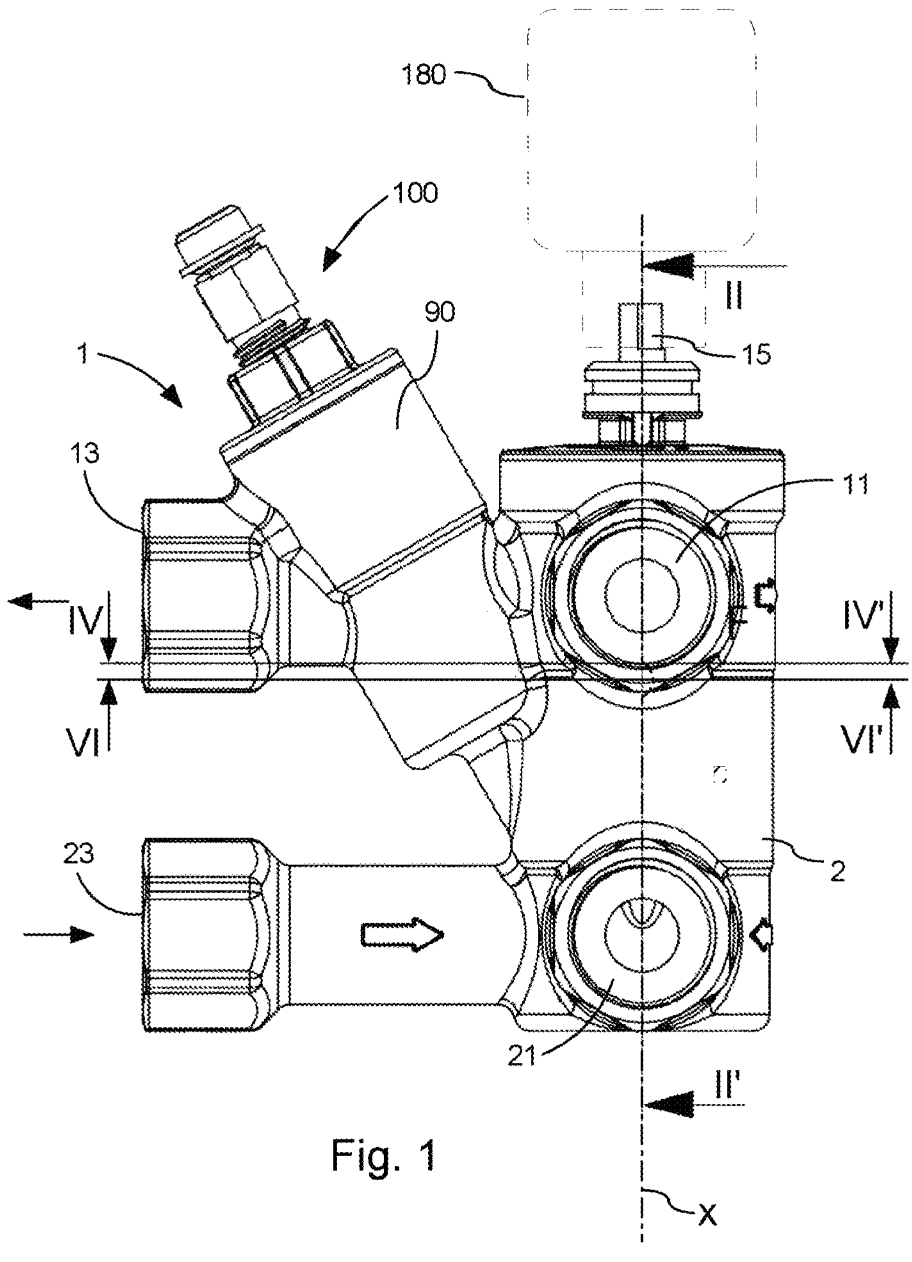
FIG. 1 is a side view of a 6-way control valve according to an embodiment.
Figure 2:
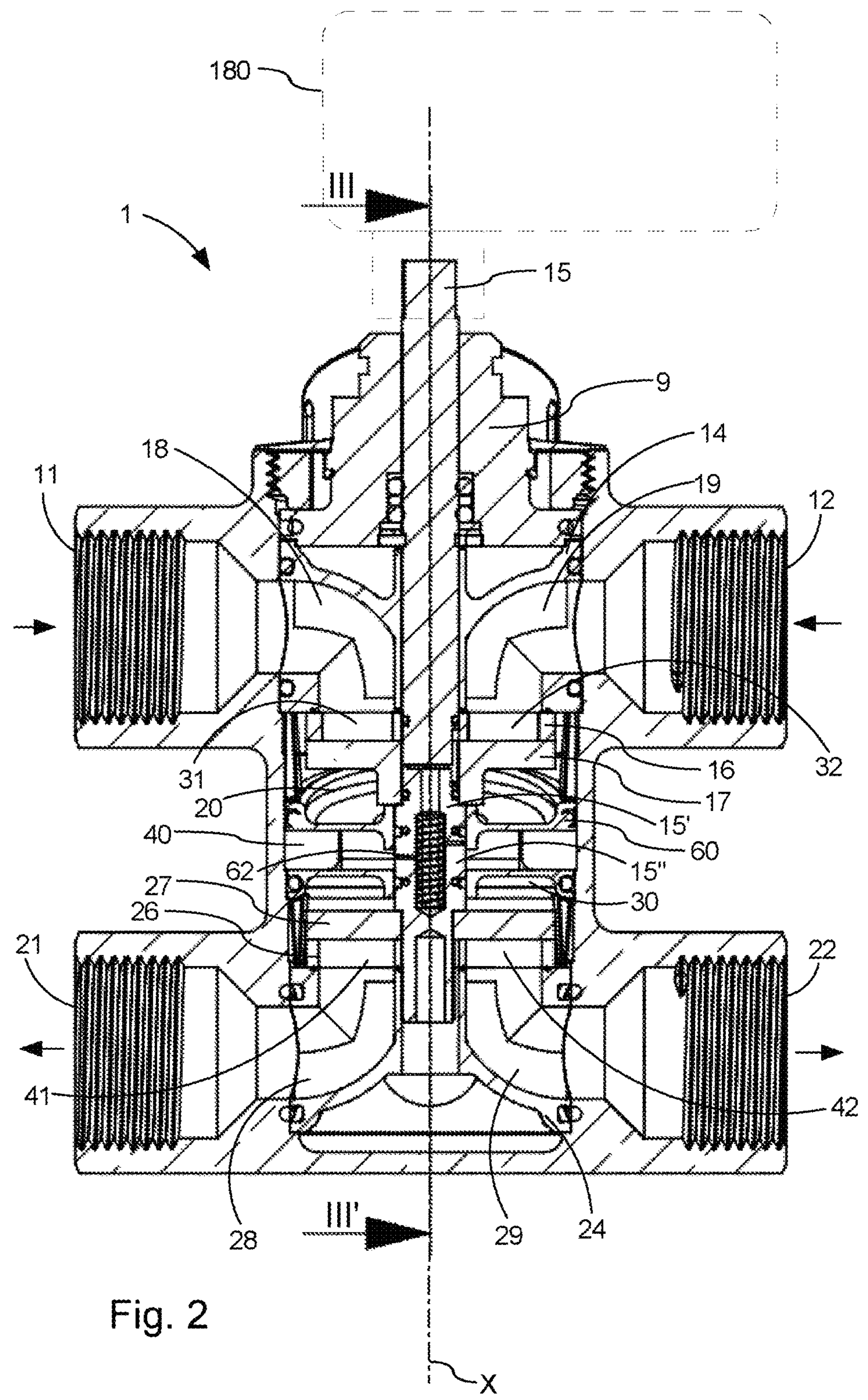
FIG. 2 is a sectional view of the valve of FIG. 1 along the line II-II'.
Figure 3:
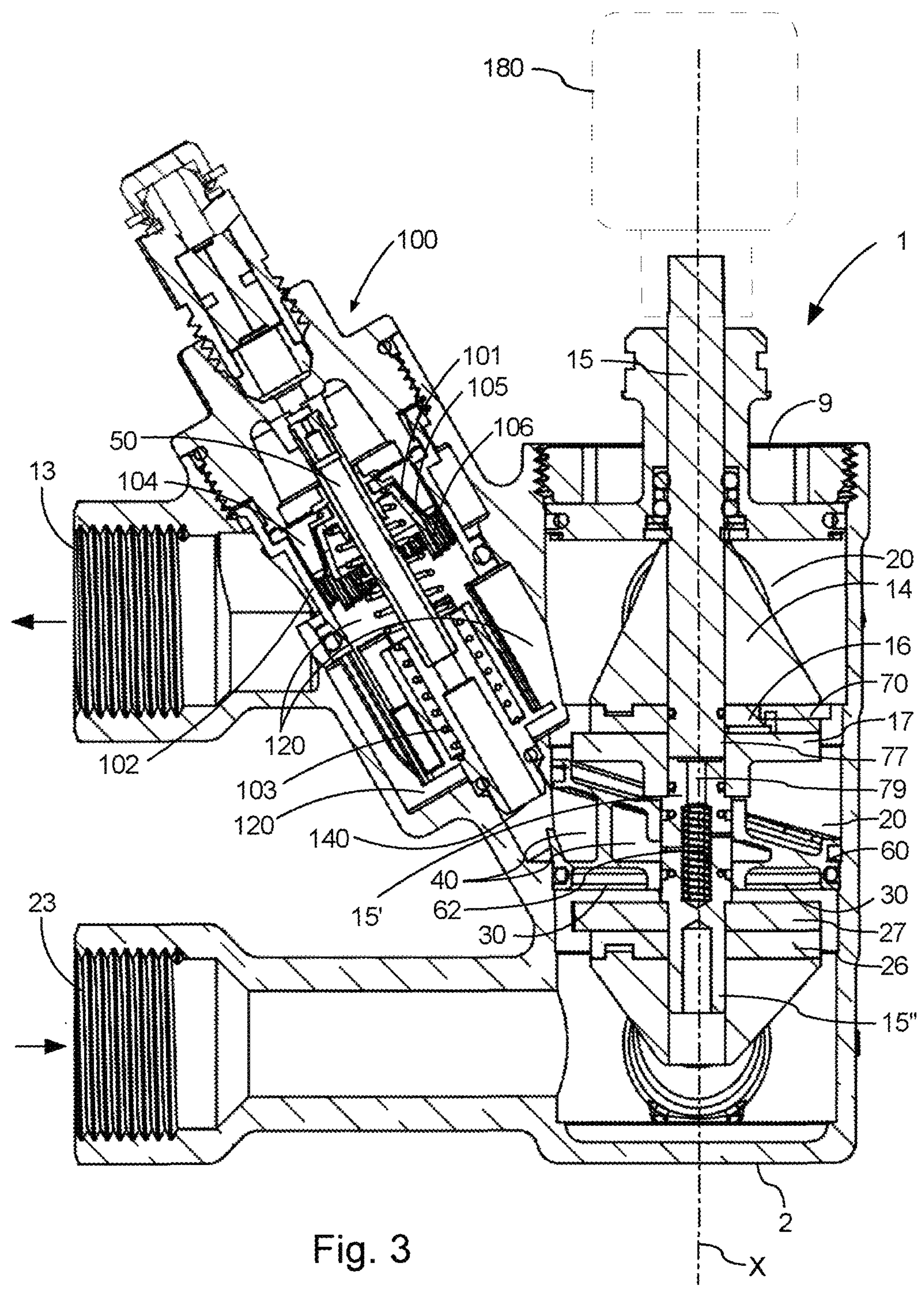
FIG. 3 is a sectional view of the valve of FIG. 1 along the line III-III'.
Figures 4, 5:
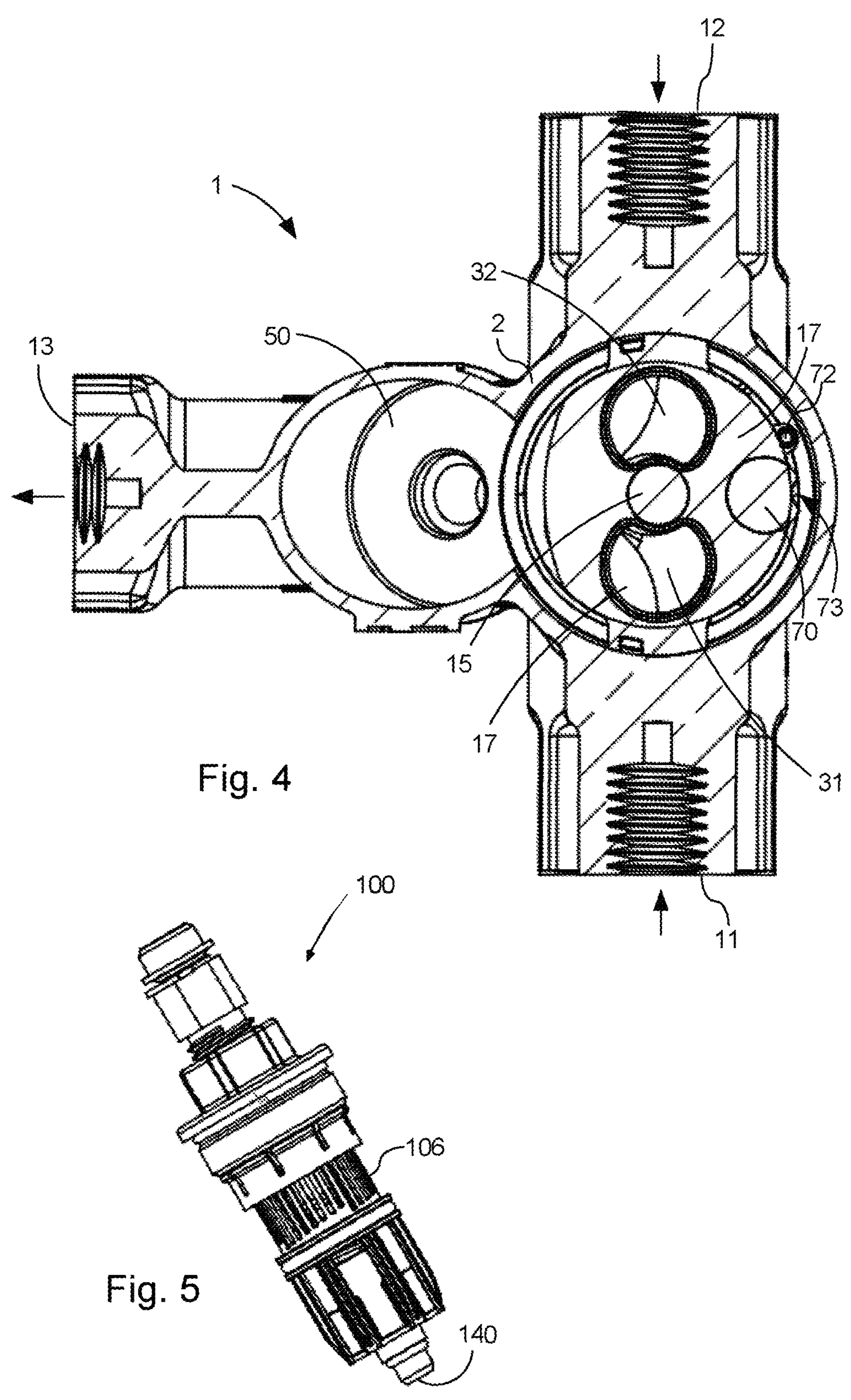
FIG. 4 is a sectional view of the valve of FIG. 1 along the line IV-IV'.
FIG. 5 is a side view differential pressure regulator.
Figure 6:
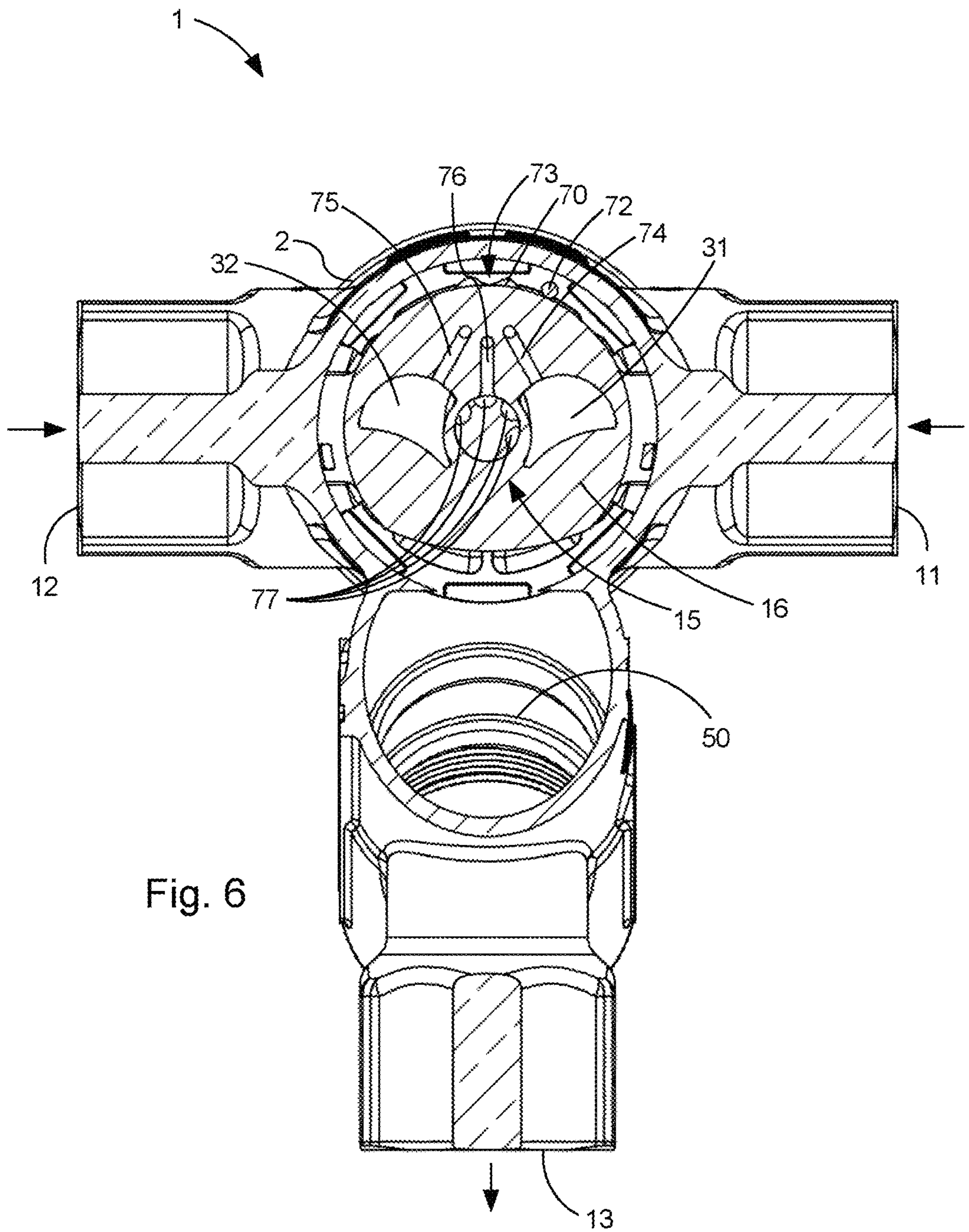
FIG. 6 is a view of the valve of FIG. 1 along the line V-V'.
Figure 7:
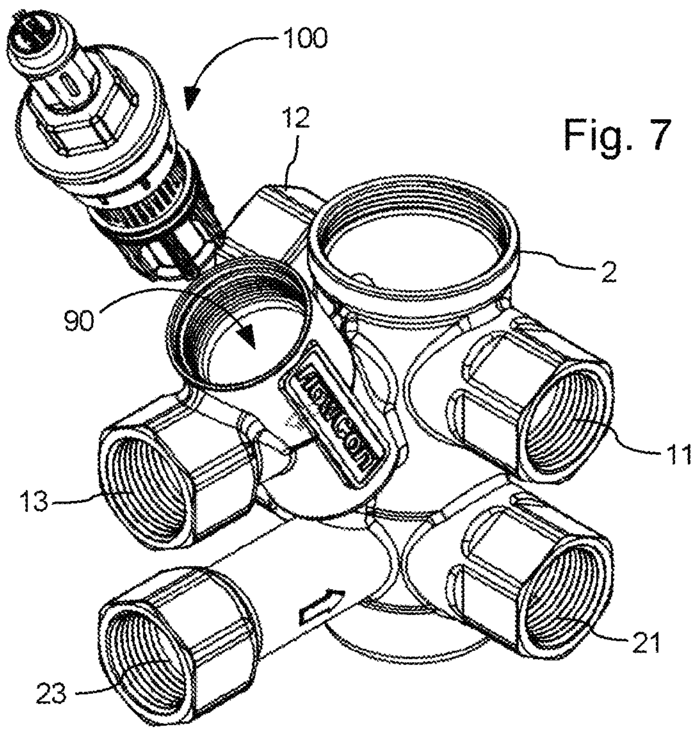
FIG. 7 is an exploded elevated view of the valve body of the valve of FIG. 1 showing the differential pressure regulator outside the valve body.
Figure 8:
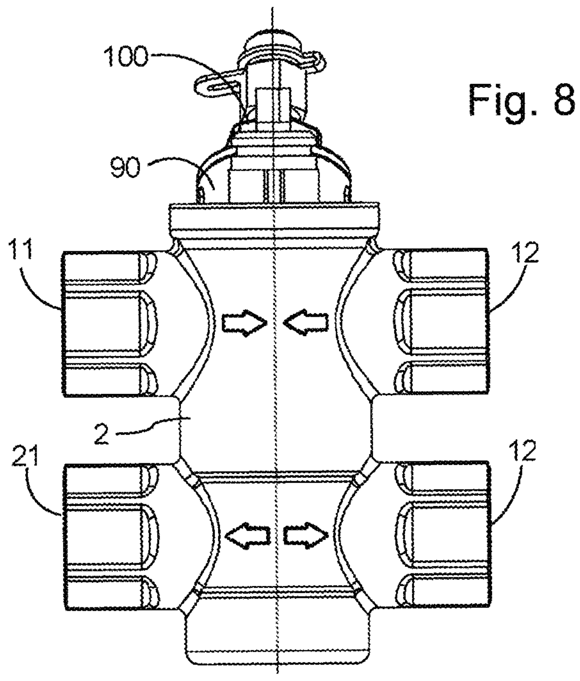
FIG. 8 is another side view of the valve of FIG. 1.
Figures 9, 10, 11, 12:
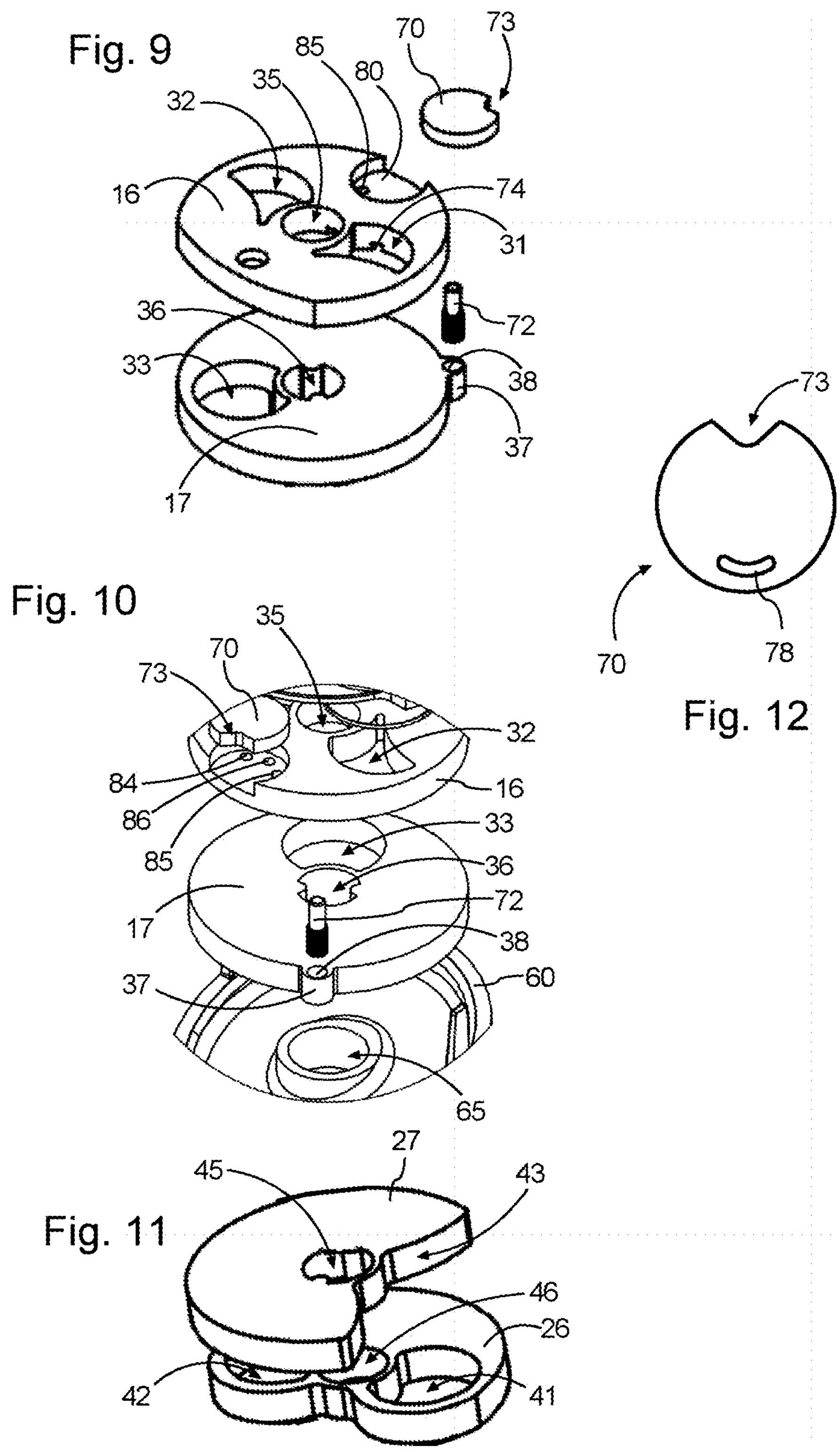
FIG. 9 is an exploded view of the ceramic plates of the valve of FIG. 1.
FIG. 10 is another exploded view of the ceramic plates of the valve of FIG. 1.
FIG. 11 is another exploded view of the ceramic plates of the valve of FIG. 1.
FIG. 12 is a top view of a pressure-selection disk of the valve of FIG. 1.
Figure 13:
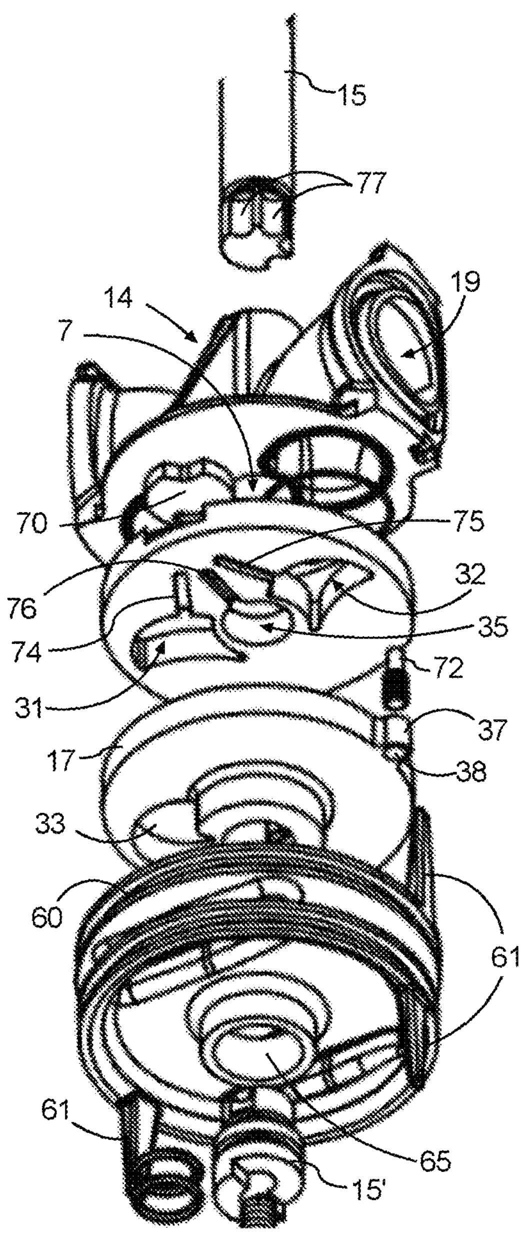
FIG. 13 is another exploded view of some of the components of the valve of FIG. 1, FIGS. 14 to 17 are top views of an embodiment of the ceramic plates used in the valve of FIG. 1, FIGS. **17*a* and 17*b* are top views of another embodiment of the ceramic plates used in the valve of FIG. 1.
Figure 18:
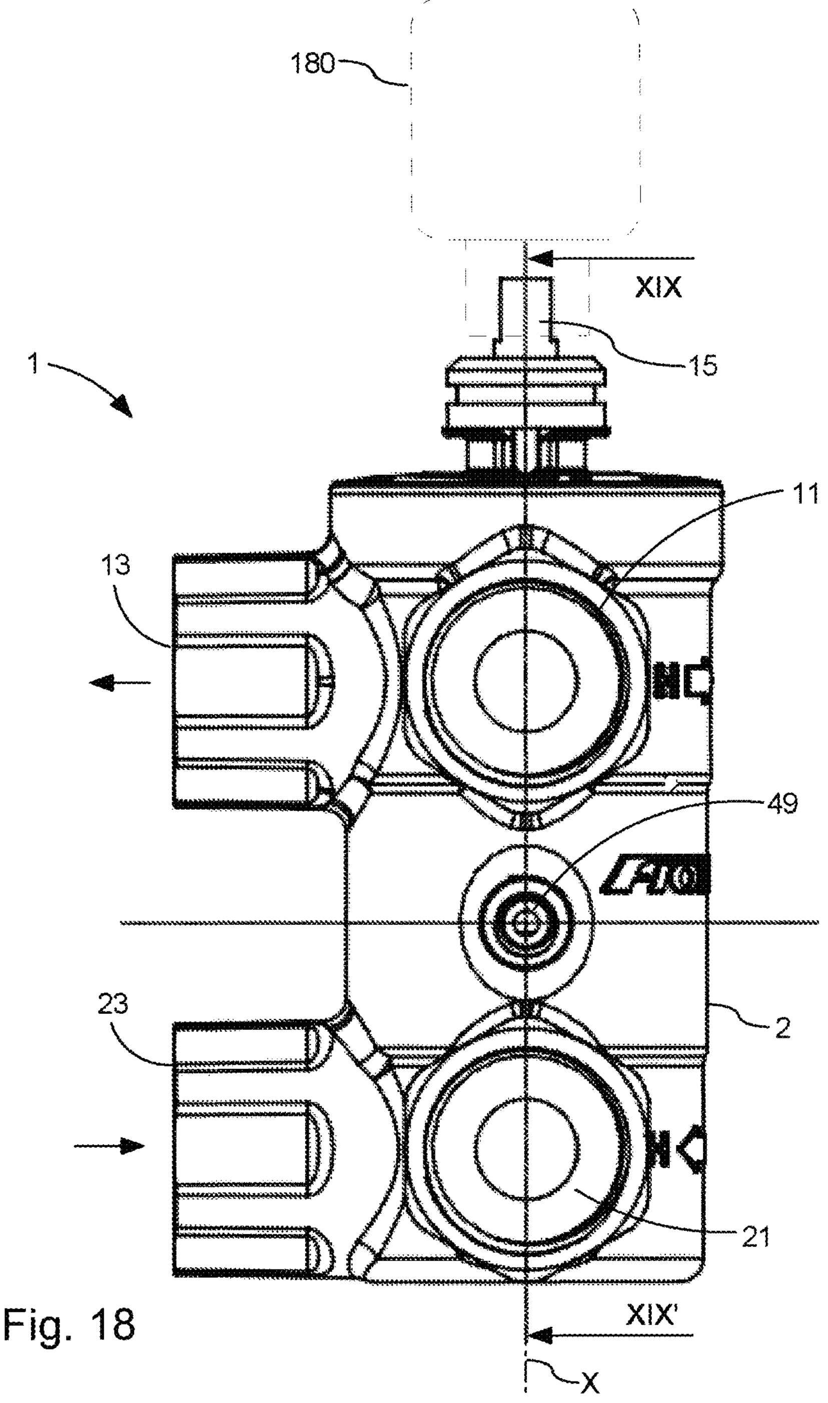
FIG. 18 is a side view of a 6-way control valve according to another embodiment.
Figure 19:
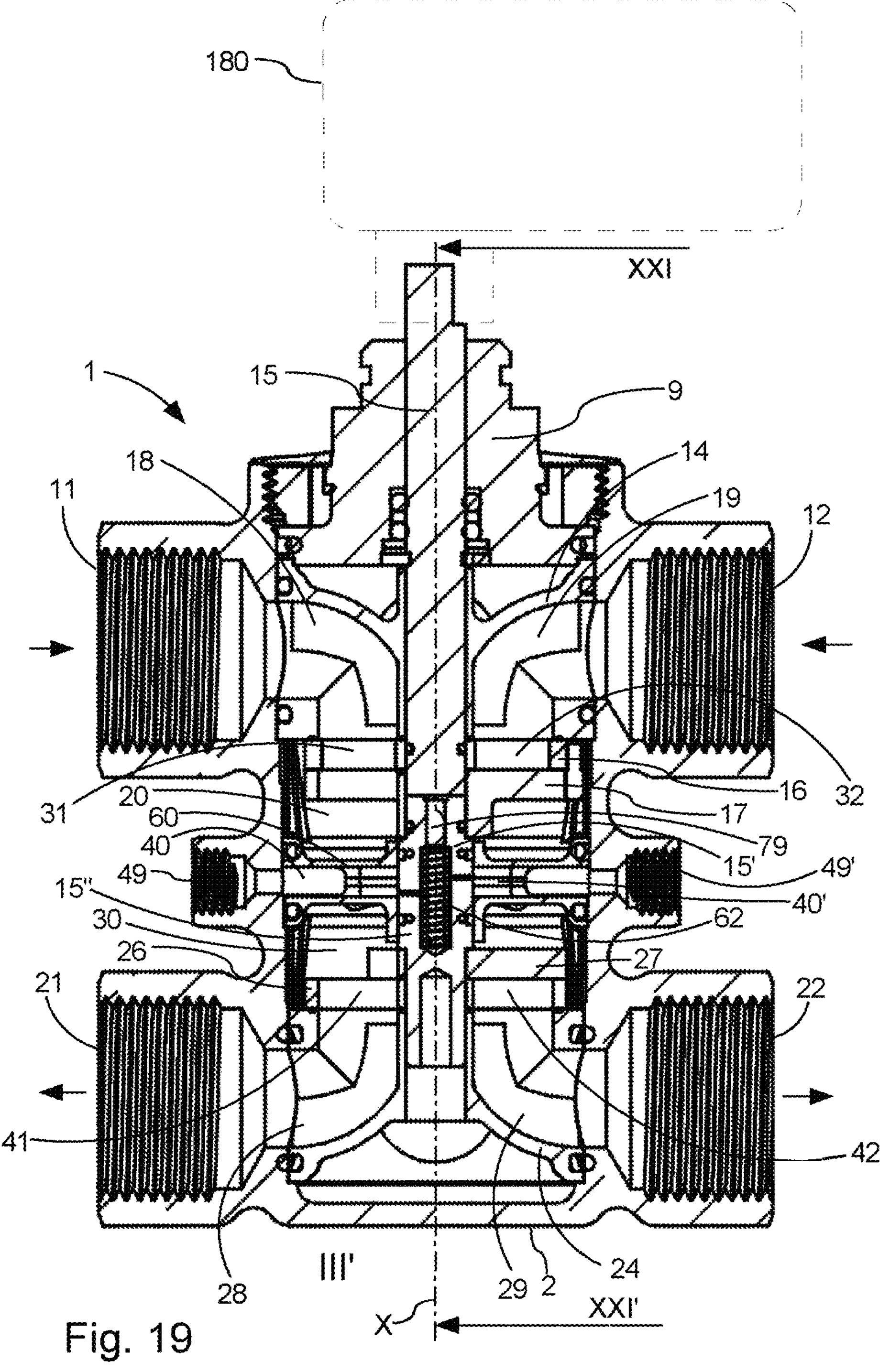
FIG. 19 is a sectional view of the valve of FIG. 18 along the line XIX-XIX'.
Figure 20:
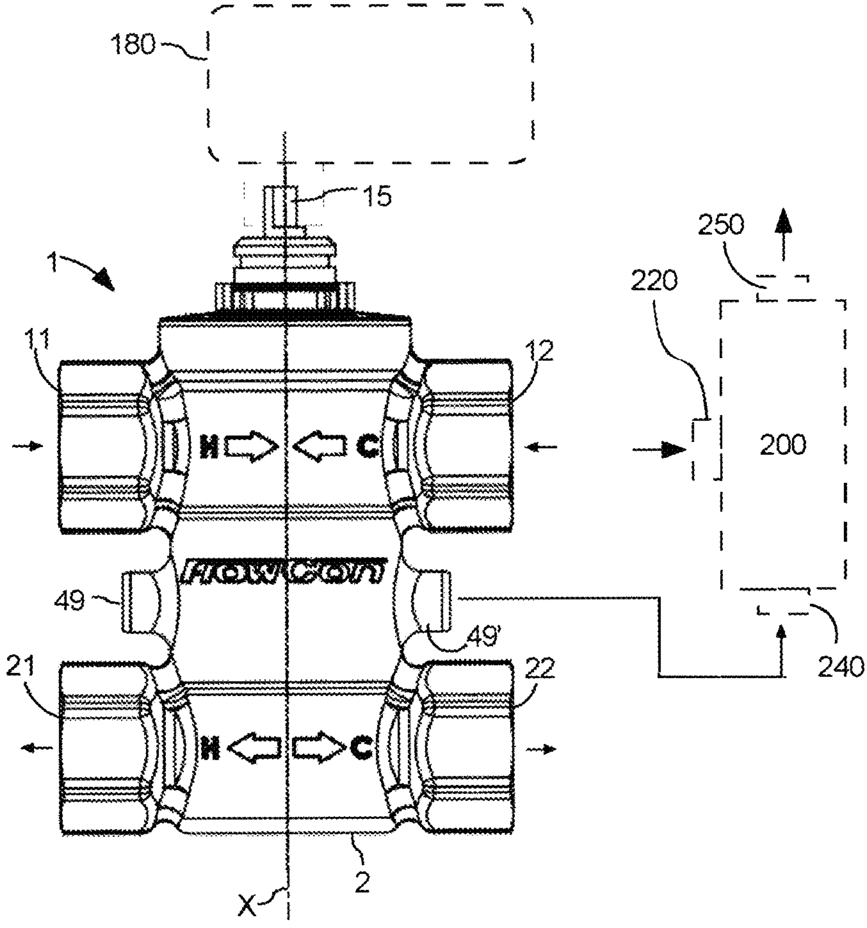
FIG. 20 is a side view of the valve of FIG. 18.
Figure 21:
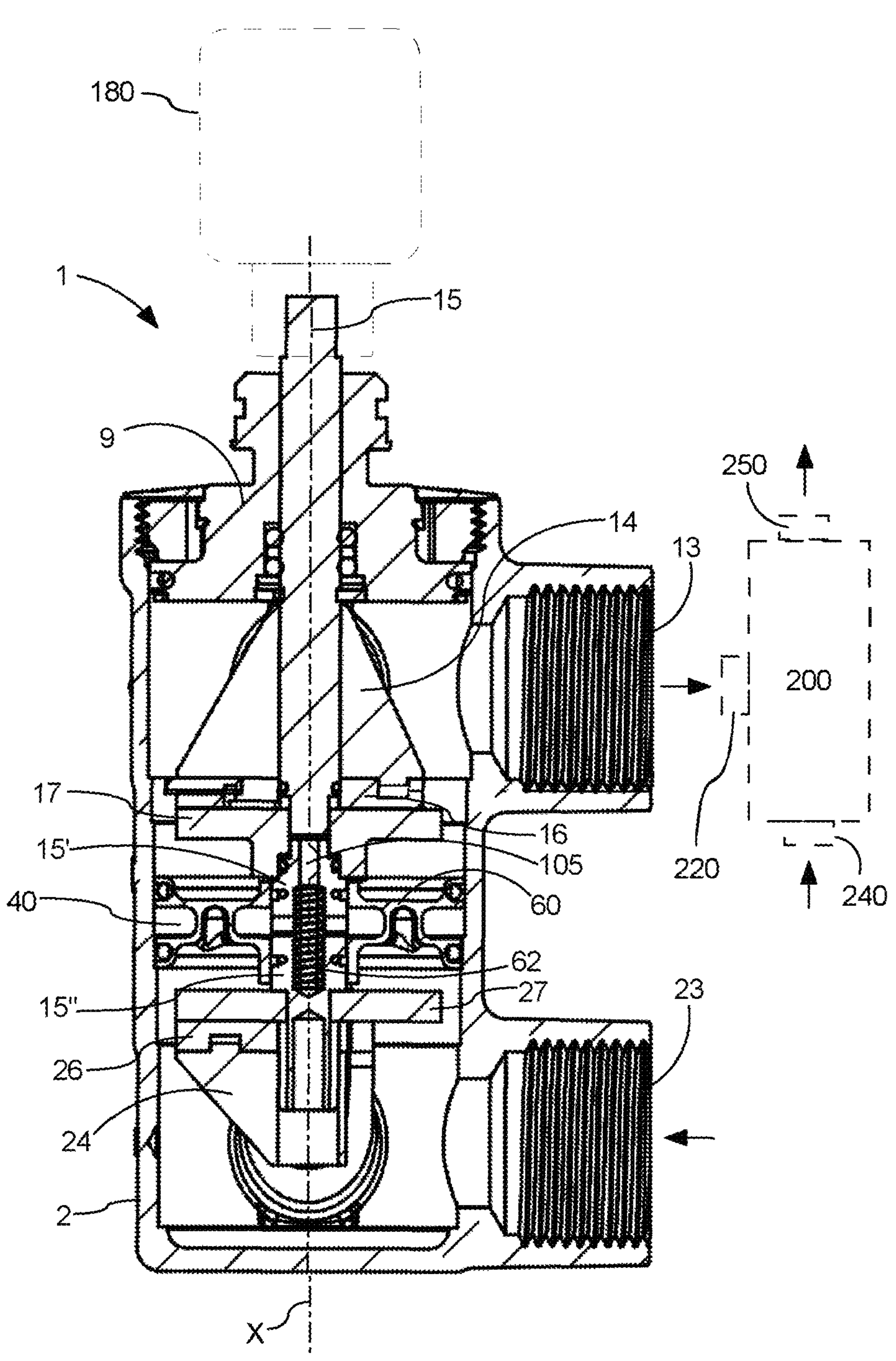
FIG. 21 is a sectional view of the valve of FIG. 18 along the line XXI-XXI'.
Figure 22:
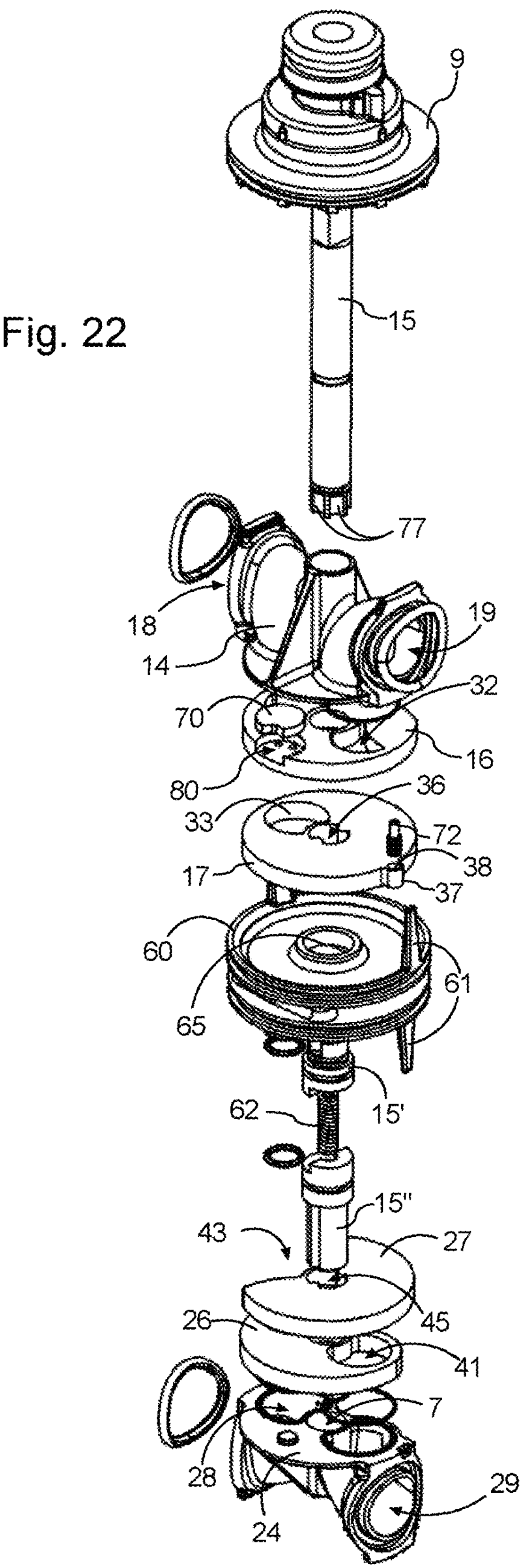
FIG. 22 is an exploded view illustrating some of the components of the valve of FIG. 18.
Figure 23:
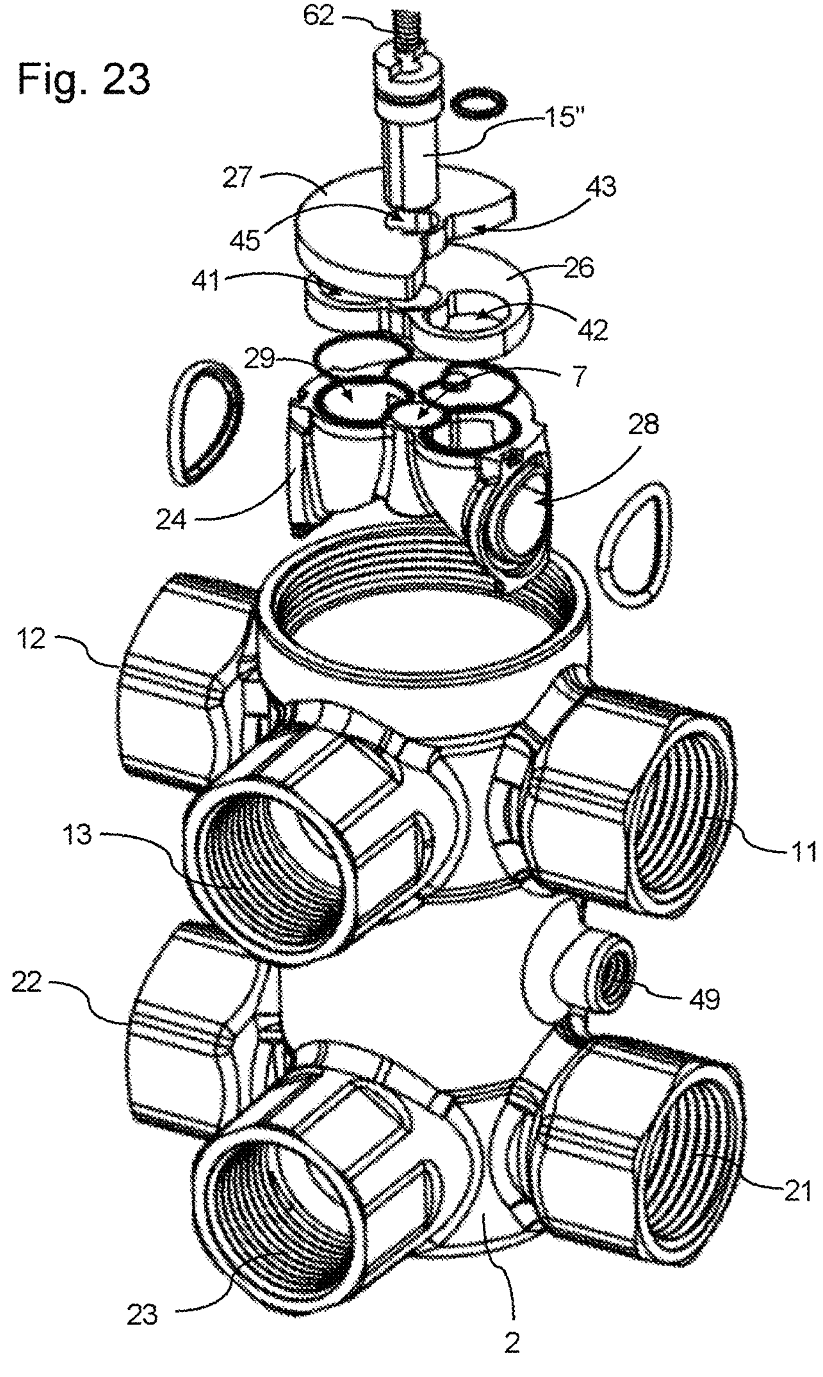
FIG. 23 is an exploded view showing the valve body and some of the components of the valve of FIG. 18.

FIGS. 1 to 17 disclose an embodiment of a 6-way control valve 1 that is essentially formed by a combination of two coupled 3-way control valves in a single valve body. Hence, it is understood that each of the 3-way valves in the 6-way valve forms an embodiment.

The arrows in the figures that have not been provided with a reference number indicate the direction of the flow for the respective ports.

The shown embodiment has a valve body 2, which is provided with a first inlet 11, a second inlet 12, and an outlet 13 that are associated with a first of the 3-way valves. the valve body 2 is further provided with an inlet 23, a first outlet 21, and a second outlet 22. Control valve 1 is suited for use with various types of systems with several fluid sources where differential pressure regulation may be required. The control valve 1 is particularly suited for using heating, ventilation, and air conditioning HVAC systems, where outlet 13 and inlet 23 may be connected to a device, e.g. a heating and/or cooling convector, and the first inlet 11 can be connected to a first fluid source for supplying the first fluid, e.g. a heating fluid to the device and the second inlet 12 can be connected to a second fluid source supplying a second fluid e.g. a coolant to the device. The return flow of the device is connected to the inlet 23, and the first outlet 21 can be connected to the return to the first fluid source and the second outlet 22 can be connected to the return of the second fluid source.

Generally, the first- and second ceramic plates 16, 17 are fluidically arranged between the first inlet 11 and the outlet 13 and the first- and second ceramic plates 16, 17 are fluidically arranged between the second inlet 12 the outlet 13, and the first- and second ceramic plates 26,27 are fluidically arranged between the first outlet of 21 and the in the 23 and the first- and second ceramic plates 26,27 are fluidically arranged between the second outlet 22 and the inlet 23.

The first inlet 11, the second inlet 12, and the outlet 13 are integral parts of valve body 2 and are substantially straight tubular members that are directed radially to the valve axis X. The first of the 12, the second outlet 22, and the inlets 23 are an integral part of the valve body 2 and are substantially straight tubular members that are directed radially to the valve axis X.

The first inlet 11, the second inlet 12, and the other 13 are arranged in the same plane, preferably with an angle of 180° between the first and second inlets and at an angle of 90° between the outlet 13 and each of the first and second inlets 11, 12. The first outlet 21, the second outlet 22, and the inlet 23 are arranged also arranged in the same plane, preferably with an angle of hundred 80° between the first- and second inlets and at an angle of 90° between the inlet 23 and each of the first and second outlets 21, 22. This angular placement allows the piping connecting the control valve 1 to the device and fluid sources to be arranged effectively.

To enable a user to select which of the first or the second inlets 11,12 are brought in fluid communication with the outlet 13, and which of the first or second outlet 21, 22 are brought in fluid communication with the inlet 23 the control valve 1 comprises an inlet selection element 17 arranged downstream of the first and the second inlets 11, 12 and upstream of the outlet 13, and an outlet selection element 27 arranged downstream of the inlet 23. The inlet selection element 17 and the outlet section element 27 are operably connected so that the first inlet 11 is connected to outlet 13 when the first outlet 21 is connected to inlet 23 and so that the second inlet 12 is connected to outlet 13 when the second outlet 22 is connected to the inlet 23.

In the shown embodiment, the inlet selection element 17 is provided by a second ceramic plate 17 that is in intimate contact with a first ceramic plate 16. A shaft 15,15' is rotationally suspended in valve body 2 with a portion of the shaft 15, 15' configured to be coupled to an actuator 180 (in the shown embodiment a rotary actuator) for rotation about a valve axis X. In the shown embodiment, shaft 15, protrudes from valve body 2 through a bore in an end plug 9 for allowing the actuator 180 to engage the protruding axial end of shaft 15.

The first, stationary, ceramic plate 16 is of oxide ceramic material and anchored in the valve body 2. The second, rotatable, ceramic plate 17 is of oxide ceramic material and is urged towards the first disk 16 by resilient means 62 that is in the present embodiment formed by a helical spring to ensure that the surfaces of the first and second ceramic plates 16, 17 are in intimate contact with each other. The first and ceramic plates 16,17 have highly polished sides for intimate contact with one another so that the second ceramic plate 17 can slide easily on the first ceramic plate 16 while preventing leakage between the sides that are in intimate contact.

The first ceramic plate 16 is held stationary against motion about the shaft 15, 15', e.g., by anchoring the first ceramic plate 16 in the valve body 2, while the second ceramic plate 17 is coupled to the shaft 15, 15' to rotate with the shaft 15, 15' without introducing any rotation of the first ceramic plate 16. hereto, and opening 36 in the second ceramic plate through which the shaft 15, 15' extent may have a noncircular cross-sectional outline, and at least the axial portion of the shaft 15, 15' that is arranged in the opening 36 having a complementary cross-sectional outline. The first ceramic plate 16 has a first through-going opening or recess 31 and a neighboring second through-going opening or recess 32. The second ceramic plate 17 has one through-going opening or recess 33.

The second ceramic plate 17 is rotatable to a first range of angular positions in which the first inlet 11 is in fluid communication with the outlet 13 and to a second range of angular positions in which the second inlet 12 is in fluid communication with the outlet 13. The first range of angular positions does not overlap with the second range of angular positions so there is never any mixing taking place in the valve. Thus, rotation of the second ceramic plate 17 between the first- and a second range of angular position, bring one of the first inlet 11 or the second inlet 12 into fluid communication with the outlet 13 and disconnects the other.

In the shown embodiment, the outlet selection element 27 is provided by a second ceramic plate 27 that is in intimate contact with a first ceramic plate 17. The shaft 15' is rotationally suspended in valve body 2 with a portion of the shaft 15" configured to be coupled to shaft 15' for rotation about a valve axis X.

The first, stationary, ceramic plate 27 is of oxide ceramic material and anchored in the valve body 2. The second, rotatable, ceramic plate 27 is of oxide ceramic material and is urged towards the first ceramic plate 26 by the resilient means 62 to ensure that the surfaces of the first and second ceramic plates 26, 27 are in intimate contact with each other. The first and ceramic plates 26, 27 have highly polished sides for intimate contact with one another so that second ceramic plate 27 can slide easily on the first ceramic plate 26 while preventing leakage between the sides that are in intimate contact.

The first ceramic plate 26 is held stationary against motion about the shaft 15", e.g., by anchoring the first ceramic plate 26 in the valve body 2, while the second ceramic plate 27 is coupled to the shaft 15'" to rotate with the shaft 15" without introducing any rotation of the first ceramic plate 26. Hereto, and opening 46 in the second ceramic plate through which the shaft 15" extents may have a noncircular cross-sectional outline, and at least the axial portion of the shaft 15" that is arranged in the opening 46 having a complementary cross-sectional outline. The first ceramic plate 26 has a first through-going opening or recess 41 and a neighboring second through-going opening or recess 42. The second ceramic plate 27 has one through-going opening or recess 43.

The second ceramic plate 27 is rotatable to a first range of angular positions in which first outlet 21 is in fluid communication with the inlet 23 and to the second range of angular positions in which the second outlet 22 is in fluid communication with the inlet 23. The first range of angular positions does not overlap with the second range of angular positions so there is never any mixing taking place in the valve. Thus, rotation of the second ceramic plate 27 between the first- and a second ranges of angular position, brings one of the first outlet 21 or the second outlet 22 into fluid communication with the inlet 23 and disconnects the other.

A first fluid passage 18 connects the first inlet port 11 to the first opening recess 31 in the first ceramic plate 16 at a side of the first ceramic plate 16 that faces away from the second ceramic plate 17. A second fluid passage 19 connects the second inlet 12 to the second opening 32 in the first plate 16 on the side of the first ceramic plate 16 that faces away from the second ceramic plate 17. A third fluid passage 20 connects outlet 13 to the one opening or recess 33 in the first ceramic plate 16 on the side of the first ceramic plate 16 that faces away from the second ceramic plate 17.

The first fluid passage 18 and the second fluid passage 19 are in an embodiment formed in a first insert 14. A bore lumen 7 with a preferably circular cross-section in the first insert 14 allows the shaft 15 to pass through insert 14. Shaft 15 preferably has a circular cross-section and a diameter relative to the diameter of the lumen 7 that results in a, preferably small, clearance between the shaft 15, 15' and the lumen 7.

The first insert 14 can be a molded article, e.g., a thermoplastic polymer material that is suitable e.g., for injection molding. The first insert 14 is received in the valve body 2 and defines the first and second fluid passages 18,19.

The third flow passage 20 is in an embodiment partially delimited by a divider 60 and partially delimited by the second ceramic plate 17. The divider 60 can be a molded article, e.g., of a thermoplastic polymer material that is suitable e.g., for injection molding. The divider 60 is received in the valve body 2 between the second ceramic plate 17 and the second ceramic plate 27 and defines a bore 65 that allows the shaft 15' and the shaft 15" to extend into the divider 60.

A fifth fluid passage 28 connects at one end sealingly using e.g., an O-ring to the port in the valve body 2 that forms the first inlet 21 and connects sealingly to the first ceramic plate 26 to open to the first opening 41. A sixth fluid passage 29 connects at one end sealingly using e.g., an O-ring to the port in the valve body 2 that forms second outlet 22 and connects sealingly to the first ceramic plate 26 to open to the second opening 42.

A seventh fluid passage 30 connects the inlet 23 to the one opening or recess 43 in the second ceramic plate 27 on the side of the first ceramic plate 27 that faces away from the first ceramic plate 26. The fifth fluid passage 28 and the sixth fluid passage 29 are in an embodiment formed in a second insert 24. A bore in the second insert 24 allows the shaft 15" to be received in and rotatably guided by the second insert 24.

The sixth flow passage 30 is partially delimited by the divider 60 and partially delimited by the second ceramic plate 27.

In an embodiment first port 21 forms a first return flow outlet to be connected to a hot water return line of the HVAC system. The second port 22 forms a second return flow outlet to be connected to a cold water return line of the HVAC system. The third port 23 forms a return flow inlet to be connected to the device. The first port 11 forms a first supply flow inlet to be connected to a hot water supply line of the HVAC system, the second port 12 forms a second supply flow inlet to be connected to a cold water supply line of the HVAC system, and the third port 13 forms a supply flow outlet to be connected to the device.

The first opening or recess 31, 41 in the first ceramic plate 16,26 at least partially overlaps the one opening 33, 42 in the second ceramic plate 17,27 in the first range of angular positions of the second ceramic plate 17,27 for fluidically connecting the first port 11, 21 to the third port 13,23 and the second opening or recess 32, 42 in the first ceramic plate 16,17 is at least partially overlapping with the one opening or recess 33,43 in the second ceramic plate 17,27 in the second range of angular positions of the second ceramic plate 17,27 for fluidically connecting the second port 12, 22 to the third port 13,23.

The size, shape, and position of the first and second openings 31, 32 in the first ceramic plate 16,26 and the one opening 33, 43 and the second ceramic plate 17, 27 are such that rotation of the second ceramic plate 17,27 between the two positions gradually changing the overlapping area between the respective openings 31, 32, 33, 41, 42, 43, whereby rotation of the inlet selection elements 17,27 allows the user to define the overlap area of to provide flow control.

The size, shape, and position of the openings 31, 32, 33, 41, 42, 43 is such that when the second ceramic plate 17,27 is in an intermediary position or an intermediary range of positions between the first and the second angular ranges, neither of the first inlet 11 or the second inlet 12 connects to the outlet 13 (and not to any other port either since there is no through going opening or hole in the first ceramic plate 16, 26 in the area of the first ceramic plate 16, 26 that overlaps with the one through going opening or recess 33,43), and likewise neither of the first outlet 21 or the second outlet 22 connects to the inlet 23, whereby a closed position or a range of closed positions is provided. The closed position or range of closed positions lies between the first- and second angular start positions. The closed position or range of closed positions corresponds to the first opening 31, 41 overlapping with area of the first ceramic plate 16, 26 without any through-going hole, i.e. the area of the first ceramic plates 16, 26 in between the neighboring first through going opening 31, 41 and second through going opening 41, 42 is free from through going openings. It is noted that the first ceramic plate 16 can be provided with additional through going openings (not shown) as long as these are not located in the area of the first ceramic plate 16 where the first through going opening 33, 43 is located when the second ceramic plate is in the closed position or in the range of closed positions.

In the shown embodiment the contour of the openings 31 and 32 has a V-shaped section, i.e., this section of the contour resembles a letter V. Although a letter V generally tapers to a point, the contour of the second opening or recess 32, 42 does not end in a sharp point to reduce the notch effect that could lead to cracks in the ceramic plates 17, 27. Hence, the very bottom of the V-shaped section of the contour of the opening is rounded to form a round bottom. However, this rounded bottom forms only a small part of the outline of openings 31 and 32.

The V-shaped section is e.g., shown in FIG. 17. In the shown embodiment the V-shaped section has a shape similar to an inwardly curving letter V, but it is understood that the V-shaped section could just as well have a shape like a letter V with at least one straight leg. The leg of the V-shaped section that is closest to the opening 35 is preferably arranged to remain substantially parallel with the circular opening 35, whilst the other leg of the V-shaped section can be inwardly curving as shown, straight, or outwardly curving. The resulting area of overlap for different angular positions of the second ceramic plate 17, 27 is illustrated by the interrupted lines. Three angular positions of the ceramic plate 17, 27 are illustrated: the closed position, a first angular position with some overlap, and a second angular position with more overlap.

The first angular range lies between a first angular start position of the second ceramic plates 17, 27 where overlap between the one opening or recess 33, 43 and the first opening or recess 31, 41 starts, and a first angular end position where an overlap area between the one opening or recess 33, 34 and the first opening or recess 31, 41 is at its maximum. The second angular range lies between a second angular start position of the second ceramic plate 17,27 where an overlap between the one opening or recess 33, 43 and the second opening or recess 32, 42 begins, and a second angular end position where an overlap area between the one opening or recess 33, 34 and the second opening or recess 32, 42 is at its maximum.

In the shown embodiment the first opening or recess 31 and the one opening or recess 33 have a contour shaped and sized to result in an overlap area that increases faster than proportionally with increasing angular distance from the first angular start position towards the first angular end position and the second opening or recess 32 and the one opening or recess 33 have a contour shaped and sized to result in an overlap area that increases faster than proportionally with increasing angular distance from the second angular start position towards the second angular end position. This faster than proportional increase is obtained by the shape of the contour of the first and second openings 31, 32, which is very different from the conventional shape of the openings 41 and 42, through the inclusion of the V-shaped section. This faster than proportional increase of the overlap allows for a characteristic of the control valve 1 that provides for a small increase of the flow when the second ceramic plate 17 is rotated from the first angular start position towards the first angular end position or on the second angular start position towards the second angular end position. This effect is demonstrated by FIGS. 15 and 17, showing that an equal change in angular position of the second ceramic plates 17,27 from the first start position towards the first end position results in a significantly smaller overlap area between the first opening 31 and the one opening 33 when compared to the overlap area between the first opening 41 and the one opening 43. Thus, with a contour, as shown for the openings 31, 32, the control valve one becomes much less sensitive to small angular changes when operating with angles that are close to the respective angular start position. This in turn lowers the requirements on the minimum angular step that the (rotary) actuator 180 need to be able to perform and lessens the requirements on precision of control of the angular position for the (rotary) actuator 180 and lessens to the requirements on hysteresis/backlash for the rotational actuator 180. The required shape for the contour that results e.g., in an equal percentages profile can be determined mathematically since the flow is proportional to the overlap area if the pressure differential is kept constant across the opening or through simple trial error.

In the shown embodiment, the first opening or recess 31 and the one opening or recess 33 have a contour shaped and sized to result in an overlap area that increases according to a function that results in an equal percentage relation between the flow through the overlap and the angle of the second plate 17 when the angle is between the first angular start position and the first angular end position, assuming that the pressure differential over the overlap is substantially constant, and the second opening or recess 32 and the one opening or recess 33 have a contour shaped and sized to result in an overlap area that increases according to a function that results in an equal percentage relation between the flow through the overlap and the angle of the second plate 17 when the angle is between the second angular start position and the second angular end position, assuming that the pressure differential over the overlap is substantially constant. A constant pressure differential over the overlap is ensured by the differential pressure regulator 100 which will be described in detail further below.

In an equal percentage characteristic, each angular increment of the second ceramic plate 17 (away from the intermediate position range) increases the flowrate by a certain percentage of the previous flowrate and vice versa.

Figure 24:
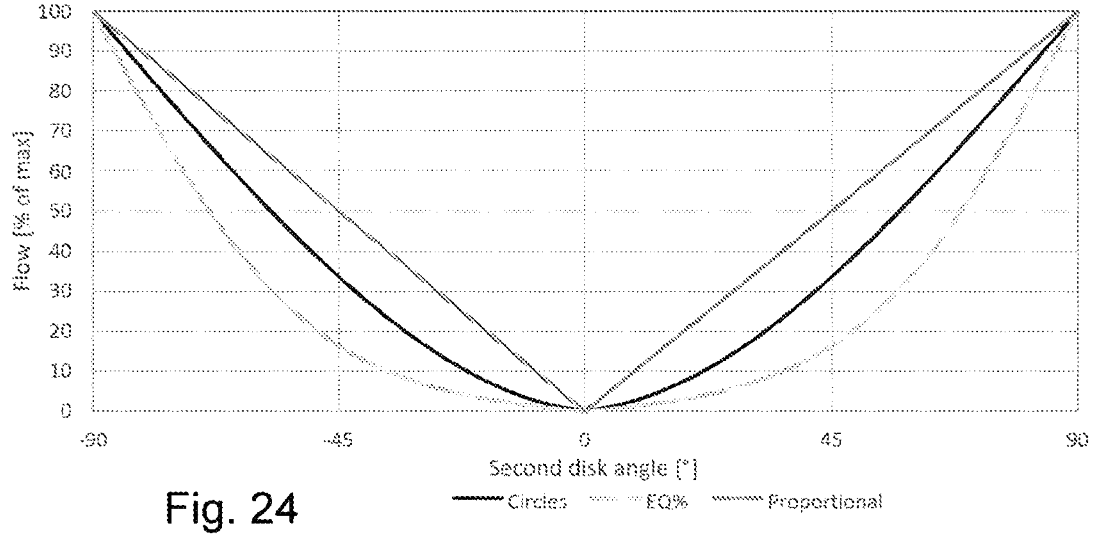
FIG. 24 is a graph describing the relation between a flow rate and the angle of one of the ceramic plates relative to the other ceramic plate.

The equal percentage relation between the angle and the resulting flow is illustrated in FIG. 24 by the light grey line. The relation between the angle and the resulting flow that is illustrated by the black line in FIG. 24 represents the flow that would be the result of an overlap between the openings 41, 42, 43 with a conventional mostly circular contour as illustrated in FIGS. 14 and 15, which shows a large increase in the flow for angular changes around the intermediate position.

In the shown embodiment the first opening or recess 31 and the one opening or recess 33 have a contour shaped and sized to result in an overlap area that increases according to a function that results in an equal percentage relation between the flow through the overlap and the angle of the second plate 17 when the angle is between the first angular start position and the first angular end position, assuming that the pressure differential over the overlap is substantially constant, and the second opening or recess 32 and the one opening or recess 33 have a contour shaped and sized to result in an overlap area that increases according to a function that results in an equal percentage relation between the flow through the overlap and the angle of the second plate 17 when the angle is between the second angular start position and the second angular end position, assuming that the pressure differential over the overlap is substantially constant.

The contour of the first- or second opening 31, 32 comprises a substantially V-shaped portion, with a first leg of the V-shaped portion being substantially tangentially arranged and a second leg of the V-shaped portion extending in a direction between radial and tangential, the first leg and the second leg preferably forming an acute angle.

The bottom, i.e., there where the legs of the V meet, of the V-shaped portion, is rounded for reducing the notch effect, the rounded bottom preferably being small relative to the V-shaped portion.

A first leg of the V-shaped portion is outside the rounded bottom and is in the shown embodiment substantially tangentially arranged and the second leg of the V-shaped portion outside the rounded bottom is in the shown embodiment arranged at an angle to the radial direction or extends in a direction between radial and tangential, the first leg and the second leg forming an acute angle.

In the shown embodiment, the first leg of the V-shaped portion forms a flat or conical surface, and the second leg of the V-shaped portion forms a conical surface. However, it is understood that in other embodiments the second leg of the V-shaped portion and forms a flat or concave surface.

Thus, the V-shaped portion may resemble a letter V with straight legs or with inwardly curved legs or with one inwardly curved leg and one straight leg, or with one inwardly curved leg and one outwardly curved leg.

The bottom of the V-shaped portion of the first opening or recess 31 is tangentially directed opposite to the bottom of the V-shaped portion of the second opening or recess 32.

In the shown embodiment the bottom of the V-shaped portion of the first- and second opening recess 31, 32 is radially closer to the shaft 15, 15' than to an outer circumference of the first or ceramic plate 16.

The top of the first and second leg of the V-shaped portion is connected by a curved portion that forms a concave surface thereby giving the first- and second opening 31, 32 a deltoid contour. The surfaces forming the first or second opening or recess 31, 32 are at a substantially right angle to the sides of the first ceramic plate 16.

The one opening 33 in the first ceramic plate has a conventional contour that is circular, except in the area closest to the shaft 15,15' to allow the one opening 33 to be arranged as close as possible to the shaft 15, 15'. Hence, a minor section of the contour of the opening 33 is formed by an inwardly bulging section that forms a convex surface.

In the shown embodiment the first- and second ceramic plates 16, 17,26,27 are flat-sided discs with a substantially uniform thickness.

To obtain a control valve 1 with a linear (proportional) characteristic the openings 31, 32, 33 in the first- and second ceramic plates 16, 17 are sized, shaped, and positioned as shown in FIGS. 17*a* and 17*b*, which results in the flow rate being proportional to the angular position of the second ceramic plate 17 at a constant differential pressure, since the shown shape for the first- and second openings 31, 32 and the one opening 33 with the edges that define the size of the overlap being straight and radially directed and the straight edges connecting to tangentially extending edges to form the contour of the respective opening results in an increase of overlap that is proportional to increase in the angle of the second ceramic plate 17 and vice versa.

Control valve 1 comprises in the present embodiment a regulator cavity 90 adapted to accommodate a differential pressure regulator 100. The regulator cavity 90 is arranged downstream of the inlet selection element 17 and upstream of the outlet 13 and is adapted to accommodate a differential pressure regulator 100 adapted to maintain a substantially constant differential pressure over the inlet selection element 17. In the shown embodiment, the regulator cavity 90 is accessible from the outside of the control valve 1 for inserting the differential pressure regulator 100 into the control valve 1. In other embodiments, the differential pressure regulator 100 may be built into the control valve 1.

To connect the regulator cavity 90 to the first and second inlets 11, 12, the control valve 1 further comprises a first fluid passage 18 and a second fluid passage 19 connecting the first inlet 11 and the second inlet 12, respectively, to the first- and second openings 31, 32, and third fluid passage 20 connecting the one opening 33 to the regulator cavity 90 at a first location. A fourth fluid passage 76, 77, 79, 40 communicates the pressure of the respective first- or second fluid passage 18, 19 to a second location in the regulator cavity 90. By providing a selective pressure communication between the first inlet 11 and the regulator cavity 90 and a second location and between the second inlet 12 and the regulator cavity 90 at the second location a differential pressure regulator 100 arranged in the regulator cavity 90 will be able to regulate the differential pressure over the inlet selection element 17 despite being arranged downstream of the inlet selection element 17. The selective connection of one of the first or the second fluid passages 11, 12 to the fourth fluid passage 76, 77, 79, 40 and the disconnection of the other 11, 12 is performed by a pressure selector which will be described in detail below.

To select which one of the first or the second fluid passages 18,19 is connected to the fourth fluid passage 76, 77, 79, 40, and thereby to the regulator cavity 90, the control valve 1 comprises the pressure selector 70 moveable between a first selection position, which establishes fluid communication between the first fluid passage 18 and the fourth fluid passage 76, 77, 79, 40, and a second selection position, which establishes fluid communication between the second fluid passage 19 and the fourth fluid passage 76,77,79,40.

The pressure selector 70 is operably connected to the second ceramic plate 17 such that pressure selector 70 is moved to the first selection position when the second ceramic plate 17 is in the first range of angular positions where it connects the first inlet 11 to the outlet 13 and such that the pressure selector 70 moved to the second selection position when the second ceramic plate 17 is in the second range of position where it connects the second inlet 12 to the outlet 13.

In the shown embodiment, the pressure selector 70 comprises a ceramic selector plate 70 having a side that engages a surface of the first ceramic plate 16 for establishing intimate contact therebetween. In the shown embodiment, the control valve 1 comprises an arrangement 72, 73 configured for moving the ceramic selector plate 70 to a first selection position when the second ceramic plate 17 is in the first range of angular positions and to a second selection position when the second ceramic plate 17 is in the second range of angular positions. In an embodiment, the ceramic selector plate 70 has an intermediate position between the first- and second selection positions.

The ceramic selector plate 70 establishes fluid communication between the first fluid passage 11 and the fourth fluid passage 76, 77, 79, 40 when it is in the first selection position and establishes fluid communication between the second fluid passage 19 and the third fluid passage 76, 77, 79, 40 when it is in the second selection position.

The ceramic selector plate 70 is slidably movable relative to the first ceramic plate 16, in the shown embodiment the movement is a rotation.

The movement of the ceramic selector plate 70 relative to the first ceramic plate 16 is guided by a recess in and/or projections on the first ceramic plate 16, in the shown embodiment the guidance is by means of a recess 80. The ceramic selector plate 70 is at least partially received in recess 80, with a portion of the ceramic selector plate 70 protruding radially from the first ceramic plate 16. In the shown embodiment, the ceramic selector plate 70 is a ceramic selection disc 70 rotatably received in the recess 80 in the first ceramic plate 16.

The control valve 1 comprises an abutment member 72 arranged to impart rotation on the ceramic selector disc 70 relative to the first ceramic plate 16 when the second ceramic plate 17 changes between the first range of angular positions and the second range of angular positions. In the shown embodiment, the abutment member 72 moves in unison with the second ceramic plate. In the shown embodiment, the ceramic selector disc 70 comprises a V-shaped recess 73. In other embodiments, the ceramic selector disc 70 may comprise a differently shaped recess or a projection for engaging the abutment member 72.

In the shown embodiment the abutment member 72 comprises a peg 72 connected to the second ceramic plate 17 to move in unison with the second ceramic plate 17. The peg 72 is partially accommodated in a bore 38 in the second ceramic plate 17 and the peg 72 extends axially from the second ceramic plate 17 in the direction towards the first ceramic plate 16, so that it engages the V-shaped recess 73 in the ceramic selector disc 70 when the pack 72 moves past the recess 73 when the second ceramic plate 17 is moved past the intermediate position. Thus, the ceramic selector disc 70 assumes the first selection position when the second ceramic plate 17 is moved from the intermediate position to the first range of angular positions and the ceramic selector disc assumes the second selection position when the second ceramic plate 17 is moved from the intermediate position to the second range of angular positions by abutment with the respective sides of the V-shaped recess 73.

In the shown embodiment, the ceramic selector plate 70 comprises a cavity 78. The cavity 78 enables a fluidic connection between the first opening or recess 31 and the regulator cavity 90 in the first selection position and enables a fluid connection between the second opening 32 and the regulator cavity 90 or the regulator outlet 49 in the second selection position.

In the shown embodiment, a first pressure communication channel 74, a second pressure communication channel 75, and a third pressure communication channel 76 are arranged in the first ceramic plate 16. The first pressure connection channel 74 opens at one end to the first opening or recess 31 and at another end to the recess 80 at a first position 84. The second pressure communication channel 75 opens at one end to the second opening or recess 32 and at another end to the recess 80 at a second position 85. The third pressure communication channel 75 opens at one end to the recess 80 at a third position 86 that is located between the first- and second positions 84, 85, and at another end opening to a bore 35 in the first ceramic plate 16 in which the shaft 15 is received.

The cavity 78 is sized, shaped, and positioned to overlap with the first position 84 and the third position 86 when the ceramic selector disc 70 is in the first selection position and wherein the cavity 78 is sized, shaped, and positioned to overlap with the second position and the third position when the ceramic selector disc 70 is in the second selection position, the cavity 78 is preferably sized shaped and positioned to only overlap with the third position 86 when the ceramic selector disc 70 is in an intermediate position between the first- and second selection positions. In the shown embodiment, cavity 78 has an elongated curved shape and extends tangentially in the ceramic selector disc 70. However, it should be understood that the cavity 78 could have any other suitable state that allows for overlapping simultaneously with the first position 84 and the third position 86 when the ceramic selector disc 70 is in the first selection position and allows for overlapping simultaneously with the second position 85 and the third position 86 when the ceramic selector disc 70 is in the second selection position.

In the shown embodiment, shaft 15 is provided with several axially extending grooves 77, that open to the third pressure communication channel 76, regardless of the angular position of shaft 15. The axially extending grooves 77 fluidically connect to a fluid passage that connects to a pressure chamber 40 that is axially disposed on the side of the second ceramic plate 17 that faces away from the first ceramic plate 16. The pressure chamber 40 opens to the regulator cavity 90.

The axially extending grooves 77 extend to the axial end of shaft 15 that abuts with an axial end of the shaft 15'. The shaft 15' is provided with an axial bore 79 that extends from the axial end of the shaft 15' that abuts the axial end of shaft 15 to the opposite end of the axial shaft 15'. A gap between the axial end of the shaft 15' and the axial end of the shaft 15" that abuts with the axial end of shaft 15' provides for a fluidic connection between the axial bore 79 and a pressure communication chamber 40 in the divider 60. The pressure convocation chamber 40 is in direct fluidic communication with the pressure regulator cavity 90.

The axial end of the shaft 15' that abuts with the axial end of the shaft 15 has a cross-sectional shape that is complementary with the cross-sectional shape of the opening 36 in the second ceramic plate 17, thereby ensuring that the shaft 15' rotates in unison with the second ceramic plate 17.

The axial end of the shaft 15" that abuts with the axial end of the shaft 15' is provided with an axial bore in which a portion of the helical spring 62 is received. The other portion of the helical spring 62 is received in the axial bore 79 in the shaft 15'. The helical spring resiliently urges the second plate 17 towards the first plate 16 and resiliently urges the second plate 27 to the first plate 26.

In the shown embodiment, a differential pressure regulator 100 is accommodated in the regulator cavity 90. Differential pressure regulators 100, in general, are well-known in the literature and come in various types. The regulator cavity 90 can be adapted to accommodate a specific type. In the shown embodiment, the differential pressure regulator 100 comprises a first hollow regulator element 101 and a second hollow regulator element 102, wherein the first regulator element

101 is displaceable along a longitudinal axis of the differential pressure regulator 100, while the second regulator element 102 is fixedly accommodated in the regulator cavity 90.

The pressure regulator 100 comprises a resilient biasing member 103 which in the shown embodiment is provided by a helical spring. The resilient biasing member 103 is operably connected to the first regulator element 101 to urge the first regulator element 101 towards a default position.

In the shown embodiment, the resilient biasing member 103 extends between the first regulator element 101 and an abutment portion fixedly connected to the second regulator element 102 by ribs which allow fluid to enter the inlet chamber 120 of the differential pressure regulator 100.

The first regulator element 101 is connected to the second regulator element 102 via a rolling diaphragm 105 which extends around the circumference of the first regulator element 101, whereby the diaphragm 105 and the first regulator element 101 defines a regulator chamber 104.

The first regulator element 101 is provided with an aperture, preferably in the form of a plurality of radially distributed slots 106, the slots 106 preferably extend axially. Slots 106 connect the inner chamber under 20 with outlet 13.

The position of the rolling membrane 105 is determined by the axial position of the first regulator element 101. The rolling membrane 105 is configured to obscure the slots 106, depending on the actual position of the first regulator element 101. In the default position, the rolling membrane 105 does either not obscure the slots 106, or the rolling membrane 105 obscures the slots 106 to the least extent. When the first regulator element 101 is in the opposite axial position of the default position the rolling membrane 105 obscures the slots to the most extent, or completely. The axial position of the first regulator element 101, and hence the rolling membrane 105, defines a flow aperture with an area depending on the position of the first regulator element 101 and the rolling membrane 105.

The pressure communication chamber 40 connects to the regulator cavity such that it is in fluid communication with the regulator chamber 90 when a differential pressure regulator 100 is accommodated in the regulator cavity 90 via a pressure communication channel 50 that extends axially and preferably concentrically in the differential pressure regulator 100. The pressure communication channel 50 opens at a pressure communication inlet 140 to an area of the regulator cavity 90 that is fluidically connected to the pressure chamber 40.

Except for the pressure communication channel 50 the regulator chamber 104 is isolated. This means that the pressure in the regulator chamber 104 during operation is substantially the same as the selected inlet 11,12 which through elements 31, 32, 74, 75, 85, 85, 86, 78, 40, 50 is brought into fluid communication with the regulator chamber 104. Effectively, the pressure in the regulator chamber 104 becomes substantially the same as the pressure of the inlet 11, 12 which is connected to outlet 13.

The inlet chamber 120 of the differential pressure regulator 100, extends to the first regulator element 101, and thus the pressure in the inlet chamber 120 acts on the first regulator element 101 and the rolling membrane 105, and this pressure urges the first regulator element 101 in the same axial direction as the resilient biasing member 103. The pressure in the regulator chamber 104 acts on the opposite side of the first regulator element 101 and the rolling membrane 105.

The inlet chamber 120 is in fluid communication with the pressure communication chamber 40, whereby fluid pressure during operation is substantially the same as the fluid pressure of the flow immediately downstream of the inlet selection element 17. Through this configuration, the first regulator element 101 senses both the pressure in the inlet chamber 120 on one side and the pressure in regulator chamber 104 on the other side.

During operation, this means that the first regulator element 101 and hence the rolling membrane 105 will set itself in a balance between the force exerted by the pressure in the regulator chamber 104, i.e., the pressure of the selected inlet 11, 12 and the forces exerted by the pressure of the inlet chamber 120 i.e., the pressure downstream of the inlet selection element 17, and the resilient biasing member 103. It should be noted that the force exerted on the first regulating element 101 by the biasing member 103 is substantially 0 N at the default position of the first regulator element 101 and that the force exerted on the first regulating element 101 by the biasing member 103 depends on the axial position of the first regulator element 101. Furthermore, in the shown embodiment wherein the biasing member 103 is provided by a helical spring, the force exerted on the first regulating element 101 by the biasing member 103 will be substantially linear if the resilient member has a linear characteristic. Other embodiments may however be provided with a biasing member 103 with non-linear characteristics.

During operation, the differential pressure over the inlet selection element 17 thus displaces the first regulator element 101 which causes a change in the area of the available flow aperture defined by the overlap of the rolling membrane 105 and the slots 106. This in turn regulates the pressure in the inlet chamber 120 by increasing/decreasing the available area for the fluid to flow to the outlet 13.

Through this continuous regulation, the differential pressure regulator 100 is able to maintain a substantially constant differential pressure over the inlet selection element 17, even when the system experiences pressure fluctuations upstream of the selected inlet 101, 102. It should be noted, that in some embodiments, the second regulator element 102 may be provided by the regulator cavity 90 itself.

FIGS. 18 to 23 disclose another embodiment of a 6-way control valve 1 that is essentially formed by a combination of two coupled 3-way control valves in a single valve body. Hence, it is understood that each of the 3-way valves in the 6-way valve forms an embodiment. In this embodiment, structures and features that are the same or similar to corresponding structures and features previously described or shown herein are denoted by the same reference numeral as previously used for simplicity.

The control valve 1 according to this embodiment is in many ways similar to the control valve 1 of the embodiment according to FIGS. 1 to 17, with a major difference being the absence of a regulator cavity in the control valve 1 according to the present embodiment. Instead, the control valve 1 according to the present embodiment is configured to be used in combination with a separate differential pressure regulating unit 200, e.g., a differential pressure regulating unit 200 with a valve body that has a regulator cavity with a differential pressure regulator 100 received therein. The separate valve body is arranged downstream of outlet 13 and provided with a pressure signal inlet 240 that is connected to the pressure signal outlet 49, 49' of the control valve 1 of the present embodiment and with an inlet 200 that is connected to outlet 13. The valve body 2 of the control valve 1 according to the present embodiment is provided with two pressure signal outlets 49, 49'. Is understood that one pressure signal outlet 49 suffices for being able to communicate the pressure at the selected inlet 11,12 to the pressure inlet 240 of the separate differential pressure regulating unit 200. The divider 60 defines the pressure chamber 40 and defines one or more pressure communication channels 40' that fluidically connect the space between the axial ends of shaft 15' and 15" to the two pressure signal outlets 49,49'.

Figure 25:
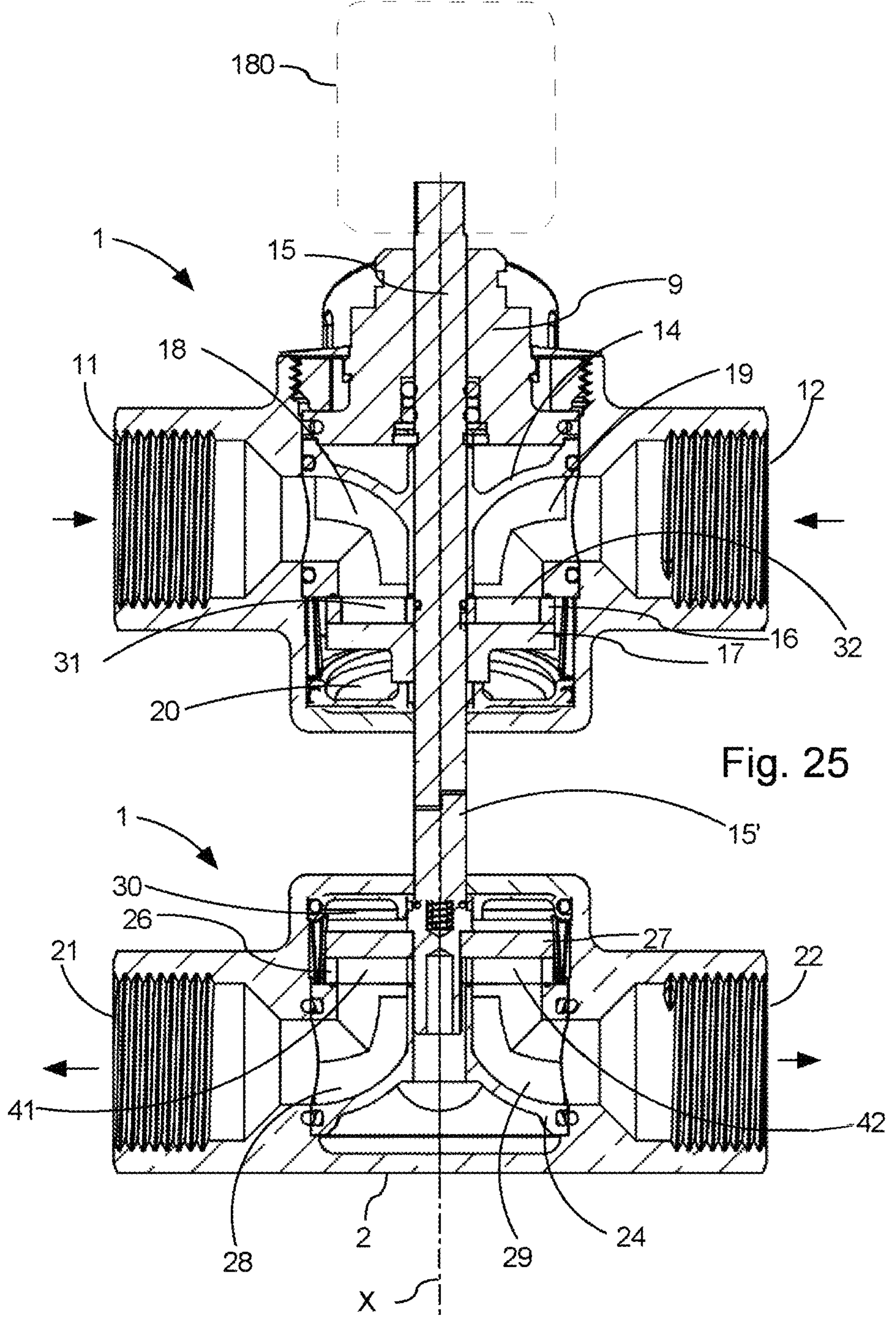
FIG. 25** is a sectional view showing a 3-way valve according to an embodiment operably coupled to another 3-way valve according to another embodiment, the operable connection of the two 3-way valves resulting in a 6-way valve.

FIG. 25 discloses a first 3-way control valve 1 according to an embodiment and a second 3-way valve 1 according to the embodiment. In this embodiment, structures and features that are the same or similar to corresponding structures and features previously described or shown herein are denoted by the same reference numeral as previously used for simplicity. In this embodiment, the two 3-way control valves 1, which each have their own valve body 2, are operably connected to one another to form a composite (separate solution) 6-way control valve that has the same functionality as the integral 6-way control valve described above. The shaft 15" of the "upper" control valve 1 is connected to the shaft 15 of the "lower" control valve 1, to ensure that these two shafts 15, 15" rotate in unison. Each of the 3-way control valves 1 can also be used individually as a control valve.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A control valve for selectively regulating a fluid flow to a device, such as a heating or cooling convector, said control valve comprising:
- a first inlet adapted to be connected to a first fluid source;
- a second inlet adapted to be connected to a second fluid source,
- an outlet adapted to be connected to the device;
- an inlet selection element arranged downstream of the first and the second inlets and upstream of the outlet,
- a regulator cavity adapted to accommodate a differential pressure regulator, said regulator cavity being arranged downstream of the inlet selection element and upstream of the outlet,
- wherein said inlet selection element is moveable between:
  - a first position in which the first inlet is in fluid communication with a first location in the regulator cavity, and
  - a second position in which the second inlet is in fluid communication with the first location in the regulator cavity,
- wherein said inlet selection element comprises a first ceramic plate and a second ceramic plate mounted about a rotatable shaft, the second ceramic plate being in intimate contact with the first ceramic plate, the first ceramic plate being held stationary against motion about the shaft, while the second ceramic plate is coupled to the shaft to rotate with the shaft without introducing any rotation of the first ceramic plate,
- a fourth fluid passage in fluid communication with a second location in the regulator cavity,
- wherein the fourth fluid passage is in fluid communication with the first inlet when the inlet selection element is in said first position, and
- wherein the fourth fluid passage is in fluid communication with the second inlet when the inlet selection element is in said second position,
- wherein the second ceramic plate is movable:
- to a first range of angular positions in which the first inlet is in fluid communication with the outlet, and
- to a second range of angular positions in which the second inlet is in fluid communication with the outlet, wherein said first range of angular positions does not overlap with said second range of angular positions,
- whereby, when a differential pressure regulator is located in said regulator cavity 90, constant differential pressure can be maintained across said inlet selection element.

2. The control valve according to claim 1, wherein said first ceramic plate has a first through-going opening or recess and a second through-going opening or recess, and said second ceramic plate has one through-going opening or recess.

3. The control valve according to claim 1, wherein said first- and second ceramic plates are fluidically arranged between said first inlet and said outlet and said first- and second ceramic plates are fluidically arranged between said second inlet and said outlet.

4. The control valve according to claim 1 wherein said first opening or recess in the first ceramic plate at least partially overlaps said one opening or recess in said second ceramic plate in a first range of angular positions of said second ceramic plate for fluidically connecting said first port to said outlet, and
- said second opening or recess in the first ceramic plate being at least partially aligned with said one opening or recess in said second ceramic plate in a second range of angular positions of said second ceramic plate for fluidically connecting said second port to said outlet.

5. The control valve according to claim 1, comprising a differential pressure regulator arranged in said regulator cavity.

6. The control valve according to claim 1, comprising a fourth fluid passage in fluid communication with the regulator cavity or with a regulator outlet.

7. The control valve of claim 6, further comprising a pressure selector, wherein said pressure selector is moveable between a first selection position, which establishes fluid communication between a first fluid passage and the fourth fluid passage, and a second selection position, which establishes fluid communication between a second fluid passage and the fourth fluid passage.

8. The control valve according to claim 7, wherein the pressure selector is operably connected to the inlet selection element such that the pressure selector is moved to said first selection position when the inlet selection element connects the first inlet to the outlet and such that the pressure selector moved to said second selection position when the inlet selection element connects the second inlet to the outlet.

9. The control valve according to claim 7, wherein the pressure selector comprises a ceramic selector plate having a side that engages a surface of said first- or second ceramic plate for establishing intimate contact therebetween.

10. The control valve according to claim 9, comprising an arrangement configured for moving said ceramic selector plate to a first selection position when said second ceramic plate is in said first range of angular positions and to a second selection position when said second ceramic plate is in said second range of angular positions.

11. The control valve according to claim 10, wherein said ceramic selector plate establishes fluid communication between the first fluid passage and the third fluid passage when it is in said first selection position and establishes fluid communication between a second fluid passage and the third fluid passage when it is in said second selection position.

12. The control valve according to claim 10, wherein said ceramic selector plate is slidably movable relative to the first- or second ceramic plate that it engages.

13. The control valve according to claim 8, wherein the movement of said ceramic selector plate relative to the first- or second ceramic plate that it is in intimate contact with is guided by a recess in and/or projections on said first- or second ceramic plate that it confronts and engages.

14. The control valve according to claim 10, wherein said ceramic selector plate is at least partially received in a recess in said first- or second ceramic plate.

15. The control valve according to claim 14, wherein said ceramic selector plate is a ceramic selection disc rotatably received in said recess in said first ceramic plate.

16. The control valve according to claim 15, wherein said ceramic selector disc at least partially protrudes radially from said recess.

17. The control valve, according to claim 15, comprising an abutment member arranged to impart rotation on said ceramic selector disc relative to said first ceramic plate when said second ceramic plate changes between said first range of angular positions and said second range of angular positions.

18. The control valve, according to claim 17, wherein said ceramic selector disc comprises a recess or a projection for engaging said abutment member.

19. The control valve, according to claim 17, wherein said abutment member comprises a peg connected to said second ceramic plate to move in unison with said second ceramic plate, said peg being partially accommodated in a bore in said second ceramic plate, said peg extending axially from said second ceramic plate in the direction towards said first ceramic plate.

20. The control valve, according to claim 9, wherein said ceramic selector plate comprises a cavity, said cavity enabling fluidic connection between said first opening or recess and said a fourth fluid passage in said first selection position and enabling a fluid connection between said second opening and a fourth fluid passage in said second selection position.

* * * * *